United States Patent
Lee et al.

(10) Patent No.: US 10,469,864 B2
(45) Date of Patent: Nov. 5, 2019

(54) METHOD AND APPARATUS FOR VIDEO SIGNAL CODING USING CURRENT PICTURE REFERENCE FLAG

(71) Applicant: KT CORPORATION, Gyeonggi-do (KR)

(72) Inventors: Bae Keun Lee, Seoul (KR); Joo Young Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 127 days.

(21) Appl. No.: 15/527,345

(22) PCT Filed: Nov. 24, 2015

(86) PCT No.: PCT/KR2015/012643
§ 371 (c)(1),
(2) Date: May 17, 2017

(87) PCT Pub. No.: WO2016/085231
PCT Pub. Date: Jun. 2, 2016

(65) Prior Publication Data
US 2017/0332097 A1    Nov. 16, 2017

(30) Foreign Application Priority Data

Nov. 27, 2014  (KR) .......................... 10-2014-0167357
Nov. 27, 2014  (KR) .......................... 10-2014-0167358
Nov. 28, 2014  (KR) .......................... 10-2014-0168582

(51) Int. Cl.
H04N 19/52     (2014.01)
H04N 19/80     (2014.01)
(Continued)

(52) U.S. Cl.
CPC ........... H04N 19/52 (2014.11); H04N 19/105 (2014.11); H04N 19/573 (2014.11); H04N 19/70 (2014.11);
(Continued)

(58) Field of Classification Search
CPC ...... H04N 19/52; H04N 19/573; H04N 19/70; H04N 19/865; H04N 19/80; H04N 19/105; H04N 19/82; H04N 19/176
(Continued)

(56) References Cited

U.S. PATENT DOCUMENTS

2009/0147853 A1   6/2009   Dane et al.
2009/0147854 A1   6/2009   Dane et al.
(Continued)

FOREIGN PATENT DOCUMENTS

CN   101534112 A   9/2009
CN   101939992 A   1/2011
(Continued)

OTHER PUBLICATIONS

Rajan Joshi et al., "High Efficiency Video Coding (HEVC) Screen Content Coding: Draft 1", JCTVC-R1005-v2, Joint Collaborative Team on Video Coding (JCT-VC) of ITU-T SG 16 WP 3 and ISO/IEC JTC 1/SC 29/WG 11 18th Meeting: Sapporo, JP, Jun. 30-Jul. 9, 2014, pp. 1-342.

*Primary Examiner* — Marnie A Matt
(74) *Attorney, Agent, or Firm* — IP Legal Services, LLC

(57) ABSTRACT

A method for processing a vide signal, according to the present invention comprises generating a reference picture list based on a current picture reference flag for a current picture, obtaining motion information about a current block in the current picture, restoring the current block using the motion information of the current block and the reference
(Continued)

picture list relating to the current picture, and applying a deblocking filter to the stored current block.

9 Claims, 10 Drawing Sheets

(51) Int. Cl.
| | |
|---|---|
| *H04N 19/86* | (2014.01) |
| *H04N 19/105* | (2014.01) |
| *H04N 19/70* | (2014.01) |
| *H04N 19/573* | (2014.01) |
| *H04N 19/176* | (2014.01) |
| *H04N 19/82* | (2014.01) |

(52) U.S. Cl.
CPC ........... *H04N 19/80* (2014.11); *H04N 19/865* (2014.11); *H04N 19/176* (2014.11); *H04N 19/82* (2014.11)

(58) Field of Classification Search
USPC .................................................. 375/240.16
See application file for complete search history.

(56) References Cited

U.S. PATENT DOCUMENTS

| | | |
|---|---|---|
| 2009/0148058 A1 | 6/2009 | Dane et al. |
| 2009/0279608 A1 | 11/2009 | Jeon et al. |
| 2009/0296811 A1 | 12/2009 | Jeon et al. |
| 2010/0020870 A1 | 1/2010 | Jeon et al. |
| 2010/0026882 A1 | 2/2010 | Jeon et al. |
| 2010/0026883 A1 | 2/2010 | Jeon et al. |
| 2010/0026884 A1 | 2/2010 | Jeon et al. |
| 2010/0027653 A1 | 2/2010 | Jeon et al. |
| 2010/0027654 A1 | 2/2010 | Jeon et al. |
| 2010/0027659 A1 | 2/2010 | Jeon et al. |
| 2010/0027660 A1 | 2/2010 | Jeon et al. |
| 2010/0027682 A1 | 2/2010 | Jeon et al. |
| 2010/0046619 A1 | 2/2010 | Koo et al. |
| 2010/0061461 A1 | 3/2010 | Bankoski et al. |
| 2010/0074334 A1 | 3/2010 | Jeon et al. |
| 2010/0080293 A1 | 4/2010 | Jeon et al. |
| 2010/0086036 A1 | 4/2010 | Jeon et al. |
| 2010/0091843 A1 | 4/2010 | Jeon et al. |
| 2010/0091844 A1 | 4/2010 | Jeon et al. |
| 2010/0091845 A1 | 4/2010 | Jeon et al. |
| 2010/0091883 A1 | 4/2010 | Jeon et al. |
| 2010/0091884 A1 | 4/2010 | Jeon et al. |
| 2010/0091885 A1 | 4/2010 | Jeon et al. |
| 2010/0091886 A1 | 4/2010 | Jeon et al. |
| 2010/0104012 A1 | 4/2010 | Koo et al. |
| 2010/0104014 A1 | 4/2010 | Koo et al. |
| 2010/0111169 A1 | 5/2010 | Jeon et al. |
| 2010/0111170 A1 | 5/2010 | Koo et al. |
| 2010/0111171 A1 | 5/2010 | Koo et al. |
| 2010/0111172 A1 | 5/2010 | Koo et al. |
| 2010/0111173 A1 | 5/2010 | Koo et al. |
| 2010/0111174 A1 | 5/2010 | Koo et al. |
| 2010/0128787 A1 | 5/2010 | Jeon et al. |
| 2010/0150234 A1 | 6/2010 | Koo et al. |
| 2010/0150235 A1 | 6/2010 | Koo et al. |
| 2010/0150236 A1 | 6/2010 | Koo et al. |
| 2010/0158112 A1 | 6/2010 | Koo et al. |
| 2010/0158113 A1 | 6/2010 | Koo et al. |
| 2010/0158114 A1 | 6/2010 | Koo et al. |
| 2010/0158117 A1 | 6/2010 | Koo et al. |
| 2010/0158118 A1 | 6/2010 | Koo et al. |
| 2010/0177824 A1 | 7/2010 | Koo et al. |
| 2010/0202519 A1 | 8/2010 | Koo et al. |
| 2010/0202521 A1 | 8/2010 | Koo et al. |
| 2010/0215100 A1 | 8/2010 | Jeon et al. |
| 2010/0260265 A1 | 10/2010 | Jeon et al. |
| 2010/0316135 A1 | 12/2010 | Jeon et al. |
| 2010/0316136 A1 | 12/2010 | Jeon et al. |
| 2010/0316360 A1 | 12/2010 | Jeon et al. |
| 2010/0316361 A1 | 12/2010 | Jeon et al. |
| 2010/0316362 A1 | 12/2010 | Jeon et al. |
| 2012/0062756 A1 | 3/2012 | Tian et al. |
| 2012/0106634 A1 | 5/2012 | Jeon et al. |
| 2012/0177125 A1 | 7/2012 | Sugio et al. |
| 2013/0022127 A1* | 1/2013 | Park ...................... H04N 19/52 375/240.16 |
| 2013/0044817 A1 | 2/2013 | Bankoski et al. |
| 2013/0051469 A1 | 2/2013 | Park et al. |
| 2013/0107949 A1 | 5/2013 | Sim et al. |
| 2013/0208792 A1* | 8/2013 | He ....................... H04N 19/105 375/240.12 |
| 2013/0279595 A1 | 10/2013 | Lee et al. |
| 2014/0023144 A1* | 1/2014 | Park ...................... H04N 19/56 375/240.16 |
| 2014/0098878 A1 | 4/2014 | Guillemot et al. |
| 2014/0140409 A1 | 5/2014 | Kim et al. |
| 2014/0211856 A1 | 7/2014 | Sugio et al. |
| 2015/0071351 A1 | 3/2015 | Lee et al. |
| 2015/0098511 A1 | 4/2015 | Park et al. |
| 2015/0117534 A1 | 4/2015 | Kim et al. |
| 2015/0124877 A1 | 5/2015 | Choi et al. |
| 2015/0163510 A1 | 6/2015 | Kim et al. |
| 2015/0163511 A1 | 6/2015 | Kim et al. |
| 2015/0172695 A1 | 6/2015 | Lee et al. |
| 2015/0172708 A1 | 6/2015 | Kim et al. |
| 2015/0208087 A1 | 7/2015 | Park et al. |
| 2015/0208089 A1 | 7/2015 | Kim et al. |
| 2015/0245048 A1 | 8/2015 | Sugio et al. |
| 2016/0037178 A1 | 2/2016 | Lee et al. |
| 2016/0065983 A1 | 3/2016 | Choi et al. |
| 2016/0100182 A1 | 4/2016 | Lee et al. |
| 2016/0105683 A1 | 4/2016 | Lee et al. |
| 2016/0119641 A1 | 4/2016 | Park et al. |
| 2016/0134889 A1 | 5/2016 | Park et al. |
| 2016/0191947 A1 | 6/2016 | Park et al. |
| 2016/0227232 A1 | 8/2016 | Choi et al. |
| 2016/0241871 A1 | 8/2016 | Park et al. |
| 2016/0295236 A1 | 10/2016 | Lee et al. |
| 2016/0309192 A1 | 10/2016 | Bankoski et al. |
| 2016/0323593 A1 | 11/2016 | Lee et al. |
| 2017/0019681 A1 | 1/2017 | Park et al. |
| 2017/0048529 A1 | 2/2017 | Kim et al. |
| 2017/0048530 A1 | 2/2017 | Kim et al. |
| 2017/0094309 A1 | 3/2017 | Lee et al. |
| 2017/0111654 A1 | 4/2017 | Park et al. |
| 2018/0152717 A1 | 5/2018 | Lee et al. |
| 2018/0152718 A1 | 5/2018 | Lee et al. |
| 2018/0160135 A1 | 6/2018 | Lee et al. |
| 2019/0124363 A1 | 4/2019 | Bankoski et al. |
| 2019/0158867 A1 | 5/2019 | Sugio et al. |

FOREIGN PATENT DOCUMENTS

| | | |
|---|---|---|
| CN | 102150429 A | 8/2011 |
| CN | 103004209 A | 3/2013 |
| CN | 103444172 A | 12/2013 |
| KR | 10-0959538 B1 | 5/2010 |
| KR | 10-2012-0027194 A | 3/2012 |
| KR | 10-2012-0140623 A | 12/2012 |
| KR | 10-2013-0116209 A | 10/2013 |
| KR | 10-2014-0022009 A | 2/2014 |
| KR | 10-2014-0111232 A | 9/2014 |
| KR | 10-2014-0122200 A | 10/2014 |
| KR | 10-2014-0133803 A | 11/2014 |
| WO | 2007/114611 A1 | 10/2007 |
| WO | 2011/099792 A2 | 8/2011 |
| WO | 2013/128832 A1 | 9/2013 |

* cited by examiner

METHOD AND APPARATUS FOR VIDEO SIGNAL CODING USING CURRENT PICTURE REFERENCE FLAG

CROSS REFERENCE TO RELATED APPLICATIONS

This application is a National Stage Patent Application of PCT International Patent Application No. PCT/KR2015/012643 (filed on Nov. 24, 2015) under 35 U.S.C. § 371, which claims priority to Korean Patent Application Nos. 10-2014-0167357 (filed on Nov. 27, 2014), 10-2014-0167358 (filed on Nov. 27, 2014), and 10-2014-0168582 (filed on Nov. 28, 2014), the teachings of which are incorporated herein in their entireties by reference.

TECHNICAL FIELD

The present invention relates to a method and an apparatus for processing a video signal.

BACKGROUND ART

Demands for high-resolution, high-quality images such as High Definition (HD) images and Ultra High Definition (UHD) images have recently increased in various fields of applications. As video data has a higher resolution and higher quality, the video data is larger in amount than traditional video data. Therefore, if video data is transmitted on an existing medium such as a wired/wireless wideband circuit or stored in an existing storage medium, transmission cost and storage cost increase. To avert these problems encountered with higher-resolution, higher-quality video data, high-efficiency video compression techniques may be used.

There are a variety of video compression techniques including inter-picture prediction in which pixel values included in a current picture are predicted from a picture previous to or following the current picture, intra-picture prediction in which pixel values included in a current picture are predicted using pixel information in the current picture, and entropy encoding in which a short code is assigned to a more frequent value and a long code is assigned to a less frequent value. Video data may be compressed effectively and transmitted or stored, using such a video compression technique.

Along with the increasing demands for high-resolution videos, demands for three-dimensional (3D) video content as a new video service have been increasing. A video compression technique for effectively providing HD and UHD 3D video content is under discussion.

DISCLOSURE

Technical Problem

An object of the present invention is to provide a method and apparatus for predicting or restoring based on a current picture reference mode in encoding/decoding a video signal.

An object of the present invention is to provide a method and apparatus for deriving a block vector used in a current picture reference mode in encoding/decoding a video signal.

An object of the present invention is to provide a method and apparatus for generating a reference picture list for a current picture reference mode in encoding/decoding a video signal.

Technical Solution

A video signal decoding method and apparatus according to the present invention includes: generating a reference picture list based on a current picture reference flag for a current picture; obtaining motion information about the current block in the current picture; restoring the current block using the motion information of the current block and the reference picture list; and applying a deblocking filter to the restored current block.

In the method and apparatus for decoding a video signal according to the present invention, the current picture reference flag indicates whether at least one block belonging to a video sequence or a picture uses a current picture reference mode.

In the method and apparatus for decoding a video signal according to the present invention, the current picture reference mode refers to a method of predicting or restoring the current block by referring to a pre-reconstructed block in the current picture.

In the method and apparatus for decoding a video signal according to the present invention, the current picture is added to the reference picture list related to the current picture based on the current picture reference flag.

A video signal decoding method and apparatus according to the present invention includes: arranging temporal reference pictures used for inter prediction of a current picture and generating a reference picture list by arranging the current picture after the arranged temporal reference pictures based on the current picture reference flag.

In the method and apparatus for decoding a video signal according to the present invention, the temporal reference picture includes at least one of a short-term reference picture and a long-term reference picture, and the temporal reference picture is arranged based on a priority order between a short-term reference picture and a long-term reference picture.

In the method and apparatus for decoding a video signal according to the present invention, the step of restoring the current block may further include determining whether or not the current picture reference mode is used in the current block, based on at least one of a reference picture index of the current block, a slice type, or a partition mode.

In the method and apparatus for decoding a video signal according to the present invention, the motion information for the current block may be derived based on whether the current block uses the current picture reference mode.

A method and apparatus for encoding a video signal according to the present invention includes: generating a reference picture list based on a current picture reference flag for a current picture; obtaining motion information about the current block in the current picture; restoring the current block using the motion information of the current block and the reference picture list for the current picture; and applying a deblocking filter to the restored current block.

In the method and apparatus for encoding a video signal according to the present invention, the current picture reference flag indicates whether at least one block belonging to a video sequence or a picture uses the current picture reference mode.

In the method and apparatus for encoding a video signal according to the present invention, the current picture reference mode refers to a method of predicting or restoring the current block by referring to a pre-reconstructed block in the current picture.

In the method and apparatus for encoding a video signal according to the present invention, the current picture is added to the reference picture list related to the current picture based on the current picture reference flag.

A video signal encoding method and apparatus according to the present invention includes: arranging temporal reference pictures used for inter-prediction of a current picture and generating a reference picture list by arranging the current picture after the arranged temporal reference pictures based on the current picture reference flag.

In the method and apparatus for encoding a video signal according to the present invention, the temporal reference picture may include at least one of a short-term reference picture and a long-term reference picture, and the temporal reference picture is arranged based on a priority order between a short-term reference picture and a long-term reference picture.

In the method and apparatus for encoding a video signal according to the present invention, the step of restoring the current block may further include determining whether or not the current picture reference mode is used in the current block, based on at least one of a reference picture index of the current block, a slice type, or a partition mode.

In the method and apparatus for encoding a video signal according to the present invention, the motion information for the current block may be derived based on whether the current block uses the current picture reference mode.

Advantageous Effects

According to the present invention, it is possible to improve the efficiency of predicting or restoring the current block based on the current picture reference mode.

According to the present invention, the motion vector or the block vector, used in the current picture reference mode, may be efficiently derived.

According to the present invention, a reference picture list for the current picture reference mode may be effectively generated.

BEST MODE FOR CARRYING OUT THE INVENTION

Figure 1:
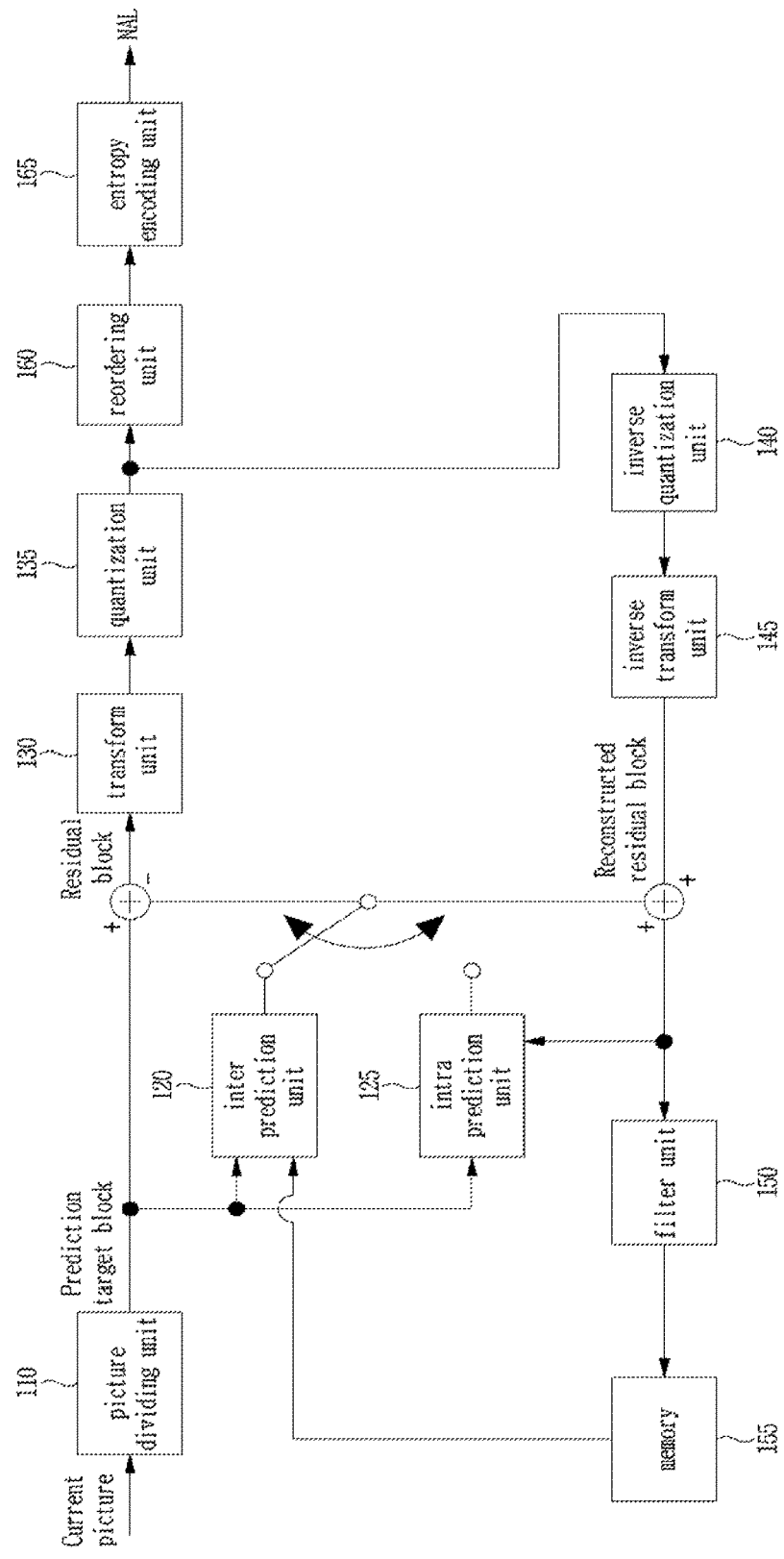
FIG. 1 is a block diagram illustrating a video encoding apparatus according to an embodiment of the present invention.

A video signal decoding method and apparatus according to the present invention includes: generating a reference picture list based on a current picture reference flag for a current picture; obtaining motion information about the current block in the current picture; restoring the current block using the motion information of the current block and the reference picture list; and applying a deblocking filter to the restored current block.

In the method and apparatus for decoding a video signal according to the present invention, the current picture reference flag indicates whether at least one block belonging to a video sequence or a picture uses a current picture reference mode.

In the method and apparatus for decoding a video signal according to the present invention, the current picture reference mode refers to a method of predicting or restoring the current block by referring to a pre-reconstructed block in the current picture.

In the method and apparatus for decoding a video signal according to the present invention, the current picture is added to the reference picture list related to the current picture based on the current picture reference flag.

A video signal decoding method and apparatus according to the present invention includes: arranging temporal reference pictures used for inter prediction of a current picture and generating a reference picture list by arranging the current picture after the arranged temporal reference pictures based on the current picture reference flag.

In the method and apparatus for decoding a video signal according to the present invention, the temporal reference picture includes at least one of a short-term reference picture and a long-term reference picture, and the temporal reference picture is arranged based on a priority order between a short-term reference picture and a long-term reference picture.

In the method and apparatus for decoding a video signal according to the present invention, the step of restoring the current block may further include determining whether or not the current picture reference mode is used in the current block, based on at least one of a reference picture index of the current block, a slice type, or a partition mode.

In the method and apparatus for decoding a video signal according to the present invention, the motion information for the current block may be derived based on whether the current block uses the current picture reference mode.

A method and apparatus for encoding a video signal according to the present invention includes: generating a reference picture list based on a current picture reference flag for a current picture; obtaining motion information about the current block in the current picture; restoring the current block using the motion information of the current block and the reference picture list for the current picture; and applying a deblocking filter to the restored current block.

In the method and apparatus for encoding a video signal according to the present invention, the current picture reference flag indicates whether at least one block belonging to a video sequence or a picture uses the current picture reference mode.

In the method and apparatus for encoding a video signal according to the present invention, the current picture reference mode refers to a method of predicting or restoring the current block by referring to a pre-reconstructed block in the current picture.

In the method and apparatus for encoding a video signal according to the present invention, the current picture is added to the reference picture list related to the current picture based on the current picture reference flag.

A video signal encoding method and apparatus according to the present invention includes: arranging temporal reference pictures used for inter-prediction of a current picture and generating a reference picture list by arranging the current picture after the arranged temporal reference pictures based on the current picture reference flag.

In the method and apparatus for encoding a video signal according to the present invention, the temporal reference picture may include at least one of a short-term reference picture and a long-term reference picture, and the temporal reference picture is arranged based on a priority order between a short-term reference picture and a long-term reference picture.

In the method and apparatus for encoding a video signal according to the present invention, the step of restoring the current block may further include determining whether or not the current picture reference mode is used in the current block, based on at least one of a reference picture index of the current block, a slice type, or a partition mode.

In the method and apparatus for encoding a video signal according to the present invention, the motion information for the current block may be derived based on whether the current block uses the current picture reference mode.

Mode For Carrying Out The Invention

The present invention may be changed and modified variously and be illustrated with reference to different exemplary embodiments, some of which will be described and shown in the drawings. However, these embodiments are not intended for limiting the invention but are construed as including includes all modifications, equivalents and replacements which belong to the spirit and technical scope of the invention. Like reference numerals in the drawings refer to like elements throughout.

Although the terms first, second, etc. may be used to describe various elements, these elements should not be limited by these terms. These terms are used only to distinguish one element from another element. For example, a first element could be termed a second element and a second element could be termed a first element likewise without departing from the teachings of the present invention. The term "and/or" includes any and all combinations of a plurality of associated listed items.

It will be understood that when an element is referred to as being "connected to" or "coupled to" another element, the element can be directly connected or coupled to another element or intervening elements. On the contrary, when an element is referred to as being "directly connected to" or "directly coupled to" another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram illustrating a video encoding apparatus according to an embodiment of the present invention.

Referring to FIG. 1, the video encoding apparatus 100 includes a picture dividing unit 110, prediction units 120 and 125, a transform unit 130, a quantization unit 135, a reordering unit 160, an entropy encoding unit 165, an inverse quantization unit 140, an inverse transform unit 145, a filter unit 150, and a memory 155.

Each of the elements shown in FIG. 1 is shown independently to represent different characteristic functions in the video encoding apparatus, and does not mean that each element is composed of separate hardware or one software configuration unit. That is, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Some elements are not essential to the substantial functions in the invention and may be optional constituents for merely improving performance. The invention may be embodied by including only constituents essential to embodiment of the invention, except for constituents used to merely improve performance. The structure including only the essential constituents except for the optical constituents used to merely improve performance belongs to the scope of the invention.

The picture dividing unit 110 may divide an input picture into at least one processing unit. Here, the processing unit may be a prediction unit (PU), a transform unit (TU) or a coding unit (CU). The picture dividing unit 110 may divide one picture into a plurality of combinations of CUs, PUs and TUs and encode the picture by selecting one combination of CUs, PUs and TUs on the basis of a predetermined criterion (for example, a cost function).

For example, one picture may be partitioned into a plurality of CUs. A recursive tree structure, such as a quad tree structure, may be used to partition a picture into CUs. A CU, for which a picture or a CU of a maximum size may be as root, may be partitioned into sub-coding units with as many child nodes as the partitioned CUs. A CU which is not partitioned any more in accordance with a predetermined limitation is a leaf node. That is, assuming that a CU may be partitioned into quadrants only, a single CU may be partitioned into at most four different CUs.

In the embodiments of the invention, a CU may be used to refer to not only a unit of encoding but also a unit of decoding.

A PU may be partitioned into at least one square or rectangular form with the same size in a CU. For PUs partitioned from a same CU, a PU may have different shape and/or size from another PU.

When a PU for intra prediction is generated based on a CU and the CU is not a minimum CU, the CU may be subjected to intra prediction without being partitioned into plural PUs (N×N).

The prediction units 120 and 125 may include an inter prediction unit 120 to perform inter prediction and an intra prediction unit 125 to perform intra prediction. The prediction units 120 and 125 may determine which of inter prediction and intra prediction is performed on a PU, and may determine specific information (for example, an intra prediction mode, a motion vector, and a reference picture) of the determined prediction method. Here, a processing unit on which prediction is performed may be different from a processing unit for which a prediction method and specific information thereon are determined. For example, a prediction method and a prediction mode may be determined for each PU, while prediction may be performed for each TU. A residual value (residual block) between a generated predicted block and an original block may be input to the transform unit 130. Further, prediction mode information, motion vector information and the like used for prediction may be encoded along with the residual value by the entropy encoding unit 165 and be transmitted to the decoding apparatus. When a specific encoding mode is used, the original block may be encoded and transmitted to the decoding apparatus without generating a prediction block by the prediction units 120 and 125.

The inter prediction unit 120 may predict a PU based on information on at least one picture among a previous picture of a current picture and a subsequent picture of a current picture. In some cases, the inter prediction unit 120 may predict a PU based on information of a partially encoded region in the current picture. The inter prediction unit 120 may include a reference picture interpolation unit, a motion prediction unit, and a motion compensation unit.

The reference picture interpolation unit may be supplied with reference picture information from the memory 155 and generate pixel information less than or equal to an integer pixel on a reference picture. In the case of luma pixels, a DCT-based 8-tap interpolation filter with a variable filter coefficient may be used to generate pixel information less than or equal to an integer pixel in a unit of a ¼ pixel. In the case of chroma pixels, a DCT-based 4-tap interpolation filter with a variable filter coefficient may be used to generate pixel information less than or equal to an integer pixel in a unit of a ⅛ pixel.

The motion prediction unit may perform motion prediction on the basis of the reference picture interpolated by the reference picture interpolation unit. Various methods, such as a full search-based block matching algorithm (FBMA), a three-step search (TSS) algorithm and a new three-step search (NTS) algorithm, may be used to calculate a motion vector. A motion vector has a motion vector value in the unit of a ½ or ¼ pixel on the basis of an interpolated pixel. The motion prediction unit may predict a current PU using different motion prediction methods. Various methods, such as skip mode, merge mode, and advanced motion vector prediction (AMVP) mode, intra block copy mode, etc. may be used as the motion prediction method.

The intra prediction unit 125 may generate a PU on the basis of information on a reference pixel neighboring to a current block. When a reference pixel is a pixel for which inter prediction has been performed because a block neighboring to the current PU is a block for which inter prediction has been performed, information on a reference pixel in the block for which inter prediction has been performed may be replaced with information on a reference pixel in a block for which intra prediction has been performed. That is, when a reference pixel is not available, information on the unavailable reference pixel may be replaced with information on at least one reference pixel of the available reference pixels.

A prediction mode of intra prediction includes a directional prediction mode in which reference pixel information is used according to a prediction direction and a non-directional prediction mode in which information on direction is not used in performing prediction. A mode for predicting luma information and a mode for predicting chroma information may be different from each other. Further, intra prediction mode information used to obtain luma information or predicted luma signal information may be used to predict chroma information.

When a PU and a TU have the same size, intra prediction on the PU may be performed based on a left pixel, an upper-left pixel and an upper pixel of the PU. On the other hand, when a PU and a TU have different sizes, intra prediction may be performed by using reference pixels which are determined based on the TU. Intra prediction using N×N partitioning may be performed only for a minimum CU.

In the intra prediction method, a predicted block may be generated by applying an adaptive intra smoothing (AIS) filter to the reference pixels according to the prediction mode. Different types of AIS filters may be applied to the reference pixels. In the intra prediction method, the intra prediction mode of a current PU may be predicted from an intra prediction mode of a PU neighboring to the current PU. In predicting the prediction mode of the current PU using mode information predicted from a neighboring PU, when the current PU and the neighboring PU have the same intra prediction mode, information indicating that the current PU and the neighboring PU have the same prediction mode may be transmitted using predetermined flag information. When the current PU and the neighboring PU have different prediction modes, information on the prediction mode of the current block may be encoded by entropy encoding.

A residual block including residual information may be generated. The residual information is a difference between the original block of the PU and the predicted block of a PU generated by the prediction units 120 and 125. The generated residual block may be input to the transform unit 130.

The transform unit 130 may transform the residual block using a transform method such as Discrete Cosine Transform (DCT), Discrete Sine Transform (DST) or KLT. The residual block includes information on the residual between the PU generated by the prediction units 120 and 125 and the original block. A transform method to be used to transform the residual block may be determined among DCT, DST and KLT on the basis of the information on the intra prediction mode of the PU which is used to generate the residual block.

The quantization unit 135 may quantize values transformed into a frequency domain by the transform unit 130. A quantization coefficient may be changed depending on a block or importance of an image. Values output from the quantization unit 135 may be provided to the dequantization unit 140 and the rearrangement unit 160.

The rearrangement unit 160 may rearrange quantized coefficients.

The rearrangement unit 160 may change a two-dimensional (2D) block of coefficients into a one-dimensional (1D) vector of coefficients through coefficient scanning. For example, the rearrangement unit 125 may change a 2D block of coefficients into a 1D vector of coefficients by scanning from DC coefficients to coefficients of a high frequency domain using zigzag scanning. Vertical scanning for scanning a 2D block of coefficients in a vertical and horizontal scanning for scanning a 2D block of coefficients in a horizontal direction may be used depending on a size of a TU and an intra prediction mode, instead of zigzag scanning. That is, a scanning method may be selected based on the size of the TU and the intra prediction mode, among zigzag scanning, vertical scanning, and horizontal scanning.

The entropy encoding unit 165 may perform entropy encoding on the basis of the values obtained by the rearrangement unit 160. Various encoding methods, such as exponential Golomb coding, context-adaptive variable length coding (CAVLC), or context-adaptive binary arithmetic coding (CABAC), may be used for entropy encoding.

The entropy encoding unit 165 may encode a variety of information, such as residual coefficient information and block type information on a CU, prediction mode information, partitioning unit information, PU information, transfer unit information, motion vector information, reference frame information, block interpolation information and filtering information from the rearrangement unit 160 and the prediction units 120 and 125.

The entropy encoding unit 165 may entropy-encode coefficients of a CU input from the rearrangement unit 160.

The dequantization unit 140 and the inverse transform unit 145 dequantize the values which are quantized by the quantization unit 135 and inverse-transform the values which are transformed by the transform unit 130. A reconstructed block may be generated by adding the residual values to the predicted PU. The residual values may be generated by the dequantization unit 140 and the inverse transform unit 145. The predicted PU may be predicted by the motion vector prediction unit, the motion compensation unit, and the intra prediction unit of the prediction units 120 and 125.

The filter unit 150 may include at least one of a deblocking filter, an offset unit, and an adaptive loop filter (ALF).

The deblocking filter may remove block distortion generated by boundaries between blocks in a reconstructed picture. Whether to apply the deblocking filter to a current block may be determined on the basis of pixels included in several rows or columns of the block. When the deblocking filter is applied to a block, a strong filter or a weak filter may be applied depending on a required deblocking filtering strength. When horizontal filtering and vertical filtering are performed in applying the deblocking filter, the horizontal filtering and vertical filtering may be performed in parallel.

The offset unit may apply the offset with respect to the original image to the deblocking filtered image, in units of pixels. A region to which the offset may be applied may be determined after partitioning pixels of a picture into a predetermined number of regions. The offset may be applied to the determined region in consideration of edge information on each pixel or the method of applying the offset to the determined region.

The ALF may perform filtering based on a comparison result of the filtered reconstructed image and the original image. Pixels included in an image may be partitioned into predetermined groups, a filter to be applied to each group may be determined, and differential filtering may be performed for each group. Information on whether to apply the ALF may be transferred by each coding unit (CU) and a shape and filter coefficients of an ALF to be applied to each block may vary. Further, an ALF with the same form (fixed form) may be applied to a block regardless of characteristics of the block.

The memory 155 may store a reconstructed block or picture output from the filter unit 150, and the stored reconstructed block or picture may be supplied to the prediction units 120 and 125 when performing inter prediction.

Figure 2:
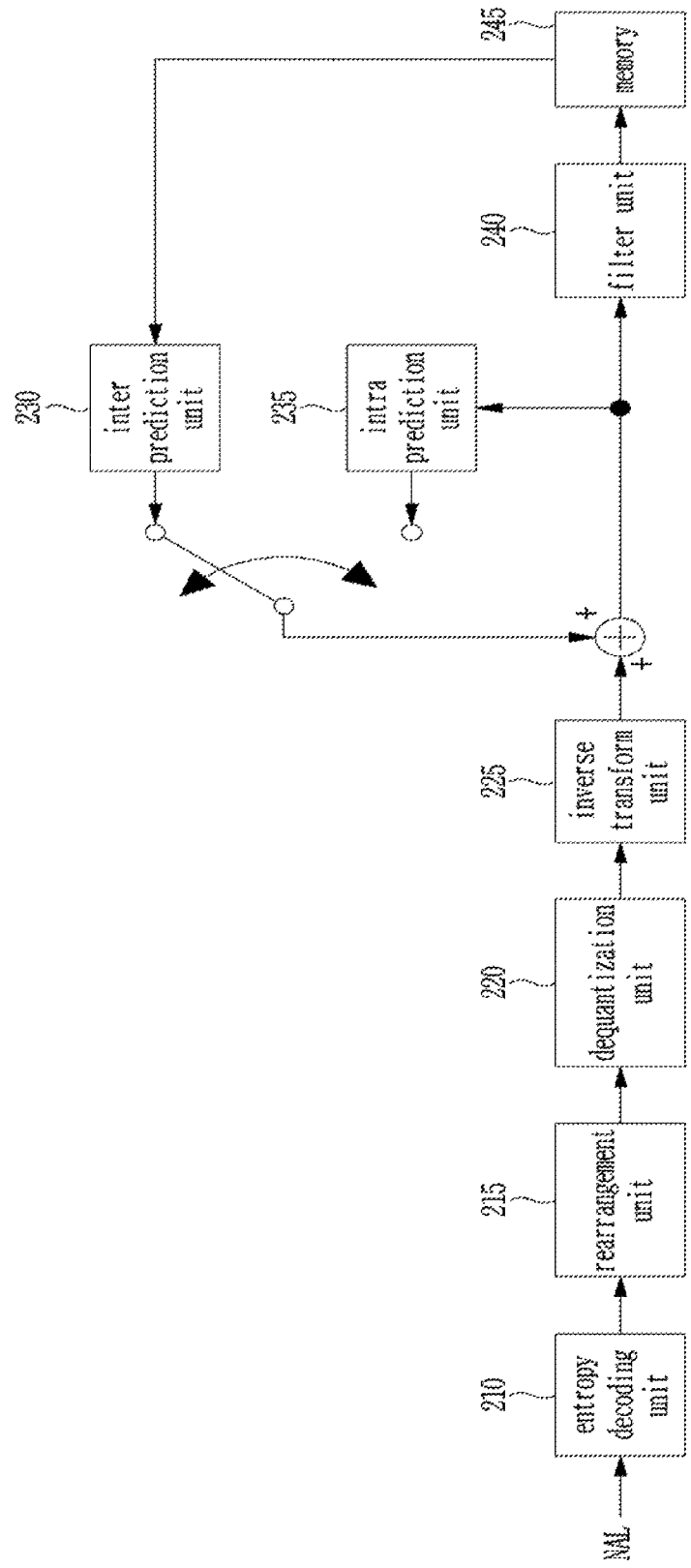
FIG. 2 is a block diagram illustrating a video decoding apparatus according an exemplary embodiment of the present invention.

FIG. 2 is a block diagram illustrating a video decoding apparatus according an exemplary embodiment of the present invention.

Referring to FIG. 2, the video decoding apparatus 200 may include an entropy decoding unit 210, a rearrangement unit 215, a dequantization unit 220, an inverse transform unit 225, prediction units 230 and 235, a filter unit 240, and a memory 245.

When a video bitstream is input from the video encoding apparatus, the input bitstream may be decoded according to an inverse process of the video encoding process performed in the video encoding apparatus.

The entropy decoding unit 210 may perform entropy decoding according to an inverse process of the entropy encoding process by the entropy encoding unit of the video encoding apparatus. For example, various methods, such as exponential Golomb coding, CAVLC or CABAC, may be used for entropy encoding, corresponding to the method used by the video encoding apparatus.

The entropy decoding unit 210 may decode information associated with intra prediction and inter prediction performed by the encoding apparatus.

The rearrangement unit 215 may perform rearrangement on the bitstream entropy-decoded by the entropy decoding unit 210 on the basis of the rearrangement method of the encoding unit. The rearrangement unit 215 may reconstruct and rearrange coefficients of a 1D vector form into coefficients of a 2D block. The rearrangement unit 215 may be provided with information on coefficient scanning performed by the encoding apparatus and may perform rearrangement using a method of inversely scanning the coefficients, on the basis of scanning order performed by the encoding apparatus.

The dequantization unit 220 may perform dequantization on the basis of a quantization parameter provided from the encoding apparatus and the rearranged coefficients of the block.

The inverse transform unit 225 may perform inverse transform performed by the transform unit (that is, inverse DCT, inverse DST or inverse KLT) on a result of quantization performed by the video encoding apparatus. Inverse transform may be performed on the basis of a transfer unit determined by the video encoding apparatus. The transform unit 225 of the video decoding apparatus may selectively perform the transform scheme (e.g., DCT, DST, KLT) depending on a plurality of information elements, such as a prediction method, a size of the current block and a prediction direction, etc.

The prediction units 230 and 235 may generate a prediction block on the basis of information for generating prediction block and information on a previously-decoded block or picture provided. The information for generating prediction block may be provided from the entropy decoding unit 210. The information on a previously-decoded block or picture may be provided from the memory 245

Similarly to the operation of the video encoding apparatus as described above, when a PU and a TU have the same size, intra prediction on the PU is performed based on left pixels, an upper-left pixel and upper pixels of the PU. On the other hand, when a PU and a TU have different sizes, intra prediction may be performed using reference pixels which are determined based on the TU. Intra prediction using N×N partitioning may be used only for a minimum CU.

The prediction units 230 and 235 may include a PU determination unit, an inter prediction unit and an intra prediction unit. The PU determination unit may receive a variety of information, such as PU information, prediction mode information on an intra prediction method and motion prediction-related information on an inter prediction method, etc. from the entropy decoding unit 210, may determine a PU for a current CU. The PU determination unit may determine which of the inter prediction and the intra prediction is performed on the PU. An inter prediction unit 230 may perform inter prediction on a current PU on the basis of information on at least one picture among a previous picture and a subsequent picture of a current picture including the current PU. An inter prediction unit 230 may use information necessary for inter prediction for the current PU provided from the video encoding apparatus. The inter prediction may be performed on the basis of the information of the pre-reconstructed partial region in the current picture including the current PU.

In order to perform inter prediction, it may be determined, in an unit of a CU, whether a motion prediction method for a PU included in the CU is a skip mode, a merge mode, an AMVP mode or intra block copy mode.

An intra prediction unit 235 may generate a prediction block on the basis of pixel information in a current picture. When a PU is a PU for which intra prediction is performed, intra prediction may be performed based on intra prediction mode information on the PU provided from the video encoding apparatus. The intra prediction unit 235 may include an AIS(Adaptive Intra Smoothing) filter, a reference pixel interpolation unit, and a DC filter. The AIS filter performs filtering on reference pixels of a current block. The AIS filter may decide whether to apply the filter or not, depending on a prediction mode for the current PU. AIS filtering may be performed on the reference pixels of the current block using the prediction mode for the PU and information on the AIS filter provided from the video encoding apparatus. When the prediction mode for the current block is a mode not performing MS filtering, the AIS filter may not be applied.

When the prediction mode for the PU indicates a prediction mode of performing intra prediction on the basis of pixel values obtained by interpolating the reference pixels, the reference pixel interpolation unit may generate reference pixels in a unit of a fractional pixel less than an integer pixel (i.e. full pixel) by interpolating the reference pixels. When the prediction mode for the current PU indicates a prediction mode of generating a prediction block without interpolating the reference pixels, the reference pixels may not be interpolated. The DC filter may generate a prediction block through filtering when the prediction mode for the current block is the DC mode.

The reconstructed block or picture may be provided to the filter unit 240. The filter unit 240 includes a deblocking filter, an offset unit, and an ALF.

The video encoding apparatus may provide information on whether the deblocking filter is applied to a corresponding block or picture, and information on which of a strong filter and a weak filter is applied when the deblocking filter is used. The deblocking filter of the video decoding apparatus may be provided with information on the deblocking filter from the video encoding apparatus and may perform deblocking filtering on a corresponding block.

The offset unit may apply offset to the reconstructed picture on the basis of information on an offset type and offset value applied to the picture in the encoding process.

The ALF may be applied to a CU on the basis of information on whether the ALF is applied and ALF coefficient information, etc. provided from the encoding apparatus. The ALF information may be included and provided in a specific parameter set.

The memory 245 may store the reconstructed picture or block for use as a reference picture or a reference block and may provide the reconstructed picture to an output unit.

As described above, in the embodiments of the invention, the term "coding unit" is used as an encoding unit for a convenience of descriptions. However, the term "coding unit" may be also used as a unit of decoding.

Figure 3:
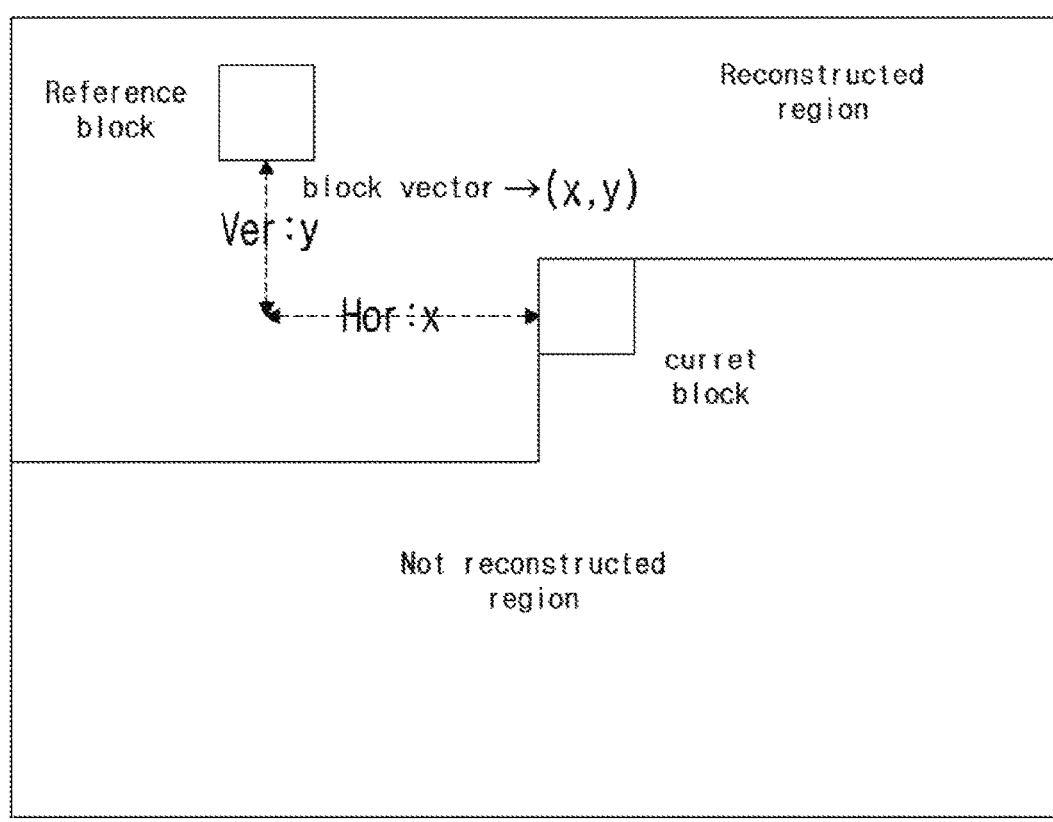
FIG. 3 illustrates a current picture reference mode according to an embodiment of the present invention.

FIG. 3 illustrates a current picture reference mode according to an embodiment of the present invention.

The block to be decoded (hereinafter, referred to as a current block) may be predicted or restored by referring to a block reconstructed before the current block (hereinafter referred to as a reference block), and the current block and the reference block may belong to the same picture. A method of predicting or restoring a current block with reference to a pre-reconstructed block in the same picture will be referred to as a current picture reference mode.

The current picture reference mode is similar to the intra mode in that the current picture reference mode uses the pre-reconstructed sample value in the same picture, but is different from the intra mode in that the current picture reference mode uses a vector representing the position difference between the current block and the reference block. In addition, the current picture reference mode is similar to the inter mode in that a block vector is used to specify a reference block, but is different from the inter mode in that the current picture reference mode uses a reference block belonging to the same picture as the current block while the inter mode uses a reference block belonging to a different picture from the current block. In case that the image contains a large number of characters such as Hangul or alphabets, if the previous block includes the character to be encoded in the current block, the encoding performance can be improved by using the current picture reference mode.

The video decoding apparatus may determine whether the current block is a block coded in the current picture reference mode. For such determination, mode information (e.g., index, flag) indicating that the current block is a block coded in the current picture reference mode may be signaled. Alternatively, whether the current block is a block coded in the current picture reference mode may be determined by checking the reference picture index of the current block.

For example, if the reference picture index of the current block specifies a picture including the current block, the current block may be predicted/restored based on the current picture reference mode. Otherwise, the current block may be predicted/restored based on a Skip mode, Merge mode or an AMVP (Advanced Motion Vector Prediction) mode.

Referring to FIG. 3, in the current picture reference mode, a neighboring block to the current block (for example, left, top, left-top neighboring block) may be used as a reference block of the current block and a block located at a certain distance in the left, top, or left-top direction may be also used as a reference block of the current block. In order to specify the position of the reference block with reference to the position of the block to be decoded, a vector composed of at least one of the x component and the y component may be used. Hereinafter, the vector will be referred to as a block vector. The block vector may represent the position difference between the current block and the reference block used in the current picture reference mode.

In encoding the block vector, a predicted block vector may be generated through predictive coding and a differential block vector between an original block vector and a prediction block vector may be only encoded. Here, the prediction block vector may be derived from a block vector (or a motion vector) of a neighboring block adjacent to the current block. For example, block vector candidates including a block vector (or motion vector) of at least one neighboring block may be constructed, and one of the block vector candidates may be selectively used based on an index for specifying a block vector of the current block. On the other hand, the prediction block vector is not limited to being derived from a neighboring block adjacent to the current block, and may be derived from a block vector in a maximum coding unit (largest coding unit) including the current block, and may be derived from a block vector in the maximum coding unit row (largest coding unit row) including the current block.

Alternatively, the block vector may be encoded without the above-described predictive coding process. For example, the video encoding apparatus may search for a block most similar to the current block in the same picture, determine the block as a reference block, and calculate a block vector corresponding to a position difference between the current block and the reference block. Then, the video encoding apparatus may divide the calculated block vector into an absolute value component and a sign component, and transmit them to the video decoding apparatus. The video decoding apparatus may recover the block vector by decoding the coded absolute value component and the sign component.

Figure 4:
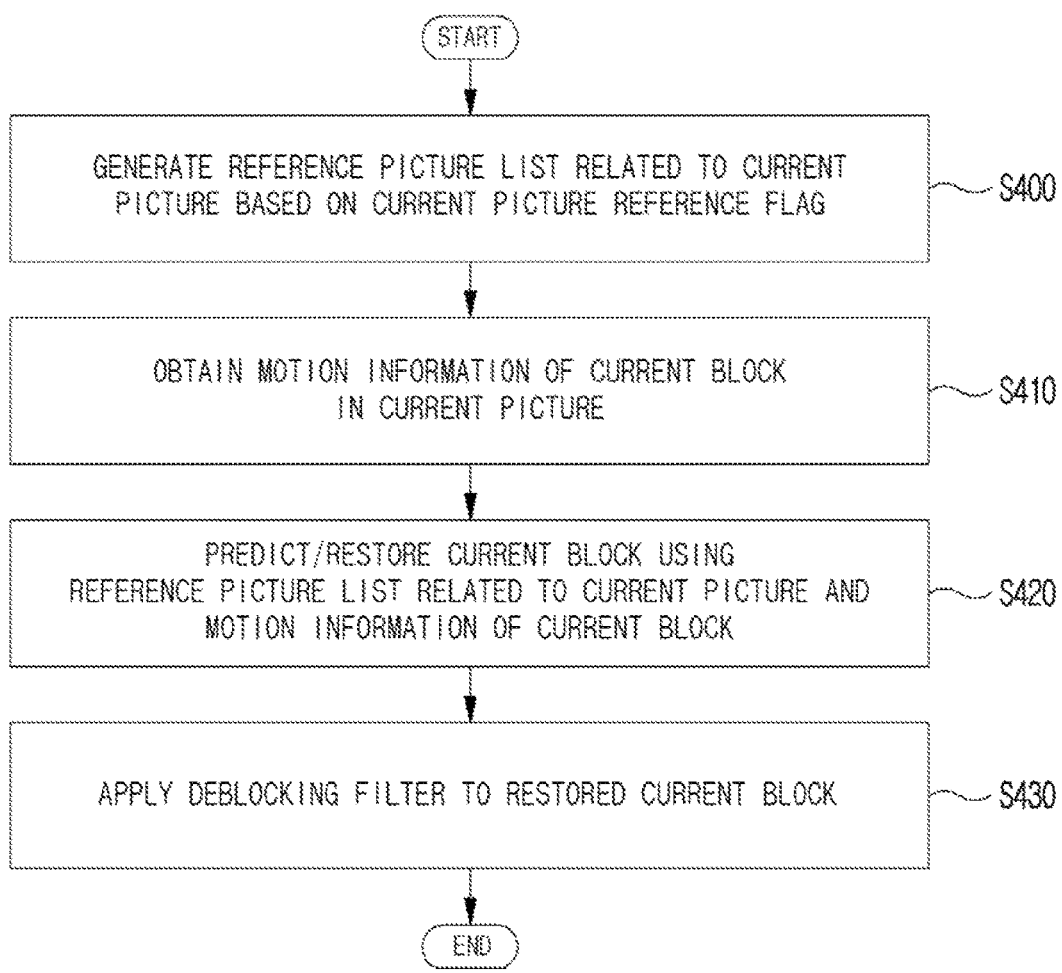
FIG. 4 illustrates a method of restoring the current block based on a current picture reference mode according to an embodiment of the present invention.

FIG. 4 illustrates a method of restoring the current block based on a current picture reference mode according to an embodiment of the present invention.

Referring to FIG. 4, a reference picture list related to the current picture may be generated based on the current picture reference flag (S400).

The current picture reference flag may indicate whether at least one block (e.g., a coding block, a prediction block) belonging to a video sequence or picture uses the current picture reference mode. The current picture reference flag may be signaled on a video sequence and/or picture basis. For example, when the value of the current picture reference flag is 1, it indicates that at least one block belonging to the current video sequence and/or the current picture uses the current picture reference mode.

The reference picture list related to the current picture may include a picture having a different temporal order from the current picture and restored before the current picture (hereinafter referred to as a temporal reference picture). A method of generating a reference picture list including temporal reference pictures will be described with reference to FIG. 5 to FIG. 7. Here, the temporal reference picture may refer to a picture to which an in-loop filter is applied. The in-loop filter may refer to at least one of the deblocking filter, the sample adaptive offset filter, and the adaptive loop filter described above.

When the current picture uses the current picture reference mode (that is, the value of the current picture reference flag is equal to 1), the current picture may be added to the reference picture list related to the current picture. The current picture may be added to the reference picture list, based on a predetermined priority. An indication "used for short-term reference" or "used for long-term reference" may be marked in the current picture, depending on the position to which the current picture is added in the reference picture list. For example, if the current picture is located between short-term reference pictures, an indication "used for short-term reference" may be marked. Alternatively, if the current picture is located after the long-term reference picture, an indication representing that the current picture is used as the long-term reference picture may be marked in the current picture. In this case, the current picture may be a picture to which an in-loop filter is not applied, unlike the other pictures included in the reference picture list. Alternatively, it may be added to the reference picture list after the in-loop filter is selectively applied to the pre-reconstructed partial area in the current picture. A method of generating a reference picture list including the current picture as a reference picture will be described with reference to FIGS. 8 to 10.

When the blocks belonging to the current picture are encoded in the intra mode and the current picture reference mode, the video encoding apparatus of the present invention encodes the slice type of the current picture into a P slice or a B slice and does not encode it into an I slice. Thus, if the current picture uses the current picture reference mode, the slice type of the current picture may be either a P slice or a B slice. If the slice type of the current picture is an I-slice, the video decoding apparatus does not allow the current picture to use the current picture reference mode.

Referring to FIG. 4, motion information on the current block in the current picture may be obtained (S410).

The motion information of the present invention may include at least one of a motion vector, a block vector, and a reference picture index. Here, the motion vector indicates the position difference between the current block in the current picture and the reference block in the picture of a different time from the current picture, and the block vector indicates the position difference between the current block in the current picture and the reference block in the current picture. However, in the present invention, the term "block vector" is merely used to distinguish these differences, and the block vector may be understood as a concept corresponding to the motion vector.

The motion vector and/or the reference picture index of the current block may be obtained based on a skip mode, a merge mode, or an advanced motion vector prediction (AMVP) mode.

Meanwhile, the block vector of the current block may be obtained by using a predicted block vector and a differential block vector. Here, the prediction block vector may be derived using a motion vector (or a block vector) of a neighboring block spatially/temporally adjacent to the current block. The neighboring blocks of the current block may be limited to only those blocks belonging to a predetermined range within the areas reconstructed before the current block. For example, there may be the restriction that the neighboring block belongs to the largest coding unit including the current block. There may be the restriction that the neighboring block belongs to the largest coding unit row including the current block. Also, if there are a plurality of neighboring blocks, a block closest to the current block in the decoding order may be used.

The block vector of the current block may be obtained using a skip mode, a merge mode, or an advanced motion vector prediction (AMVP) mode as well as the above-described method and it will be described with reference to FIGS. 11 to 12.

Referring to FIG. 4, the current block may be predicted/restored using the reference picture list of the current picture and the motion information of the current block(S420).

Specifically, the reference picture of the current block may be selected, from the reference picture list, based on the reference picture index of the current block. The motion vector (or block vector) of the current block may be used to specify the reference block in the reference picture. The reconstructed sample of the specified reference block may be used to predict/restore the current block.

If the reference picture selected based on the reference picture index of the current block is the current picture, it may be known that the current block uses the current picture reference mode. That is, the current block determines a reference block at the pre-reconstructed area of the current picture, based on the motion vector (or block vector) derived in step S410, and the reconstructed sample of the reference block may be set as the predicted sample or the restored sample.

The syntax inter_pred_idc may indicate which one is performed among a bi-directional prediction (PRED_BI) using a reference picture list 0 (list0) and a reference picture list 1 (list1), a uni-directional prediction (PRED_L0) using a list0, and a uni-directional prediction (PRED_L1) using a list1. When the current picture reference mode is used, the value of inter_pred_idc may be limited to indicate either PRED_L0 or PRED_L1. Alternatively, it may be limited to perform the bi-directional prediction (PRED_BI) only when the current block has a predetermined shape and/or size. Herein, the predetermined shape may be a case where the partition mode of the current block is a square or a symmetric partition. A predetermined size is one of the block sizes predefined in the video decoding apparatus. A predetermined size may mean the block size for which bi-directional prediction based on the current picture reference mode is allowed. Here, at least one of 4×4, 8×8, 8×4, 4×8, 16×16, etc. may be fixedly set in the video decoding apparatus.

In this way, the current picture reference mode may be selectively used for the blocks belonging to the current picture, and it may be determined whether the current picture reference mode is used for each block. Here, the block may mean a coding block belonging to a range of a maximum coding block to a minimum coding block and having a predetermined size. Alternatively, the block may mean a prediction block determined according to the partition mode of the coding block, or may be a transform block that is a basic unit for performing the transform.

Whether or not the current picture reference mode is used may be determined based on at least one of a reference picture index of the current block, a slice type, or a partition mode of the current block, and hereinafter, it will be described in detail.

1. Embodiment 1: Method Using Reference Picture Index

Whether or not the current block uses the current picture reference mode may be determined based on the reference picture index of the current block.

Specifically, the picture is selected, from the reference picture list, based on the reference picture index of the current block. when the selected picture is the current picture including the current block, it may be determined that the current block uses the current picture reference mode.

Alternatively, if the value of the current picture reference flag for the current picture is equal to 1, the current picture may be added to the reference picture list. As will be described later with reference to FIG. 5, the current picture may be located last in the reference picture list. Therefore, if the value of the reference picture index of the current block is equal to a value obtained by subtracting 1 from the total number of reference pictures belonging to the reference picture list or a maximum value among the indexes assigned to the reference picture list, it may be determined that the current block uses the current picture reference mode.

Alternatively, whether the current picture reference mode is used or not may be determined by comparing output order information(picture order count) of the current picture with output order information(picture order count) of the reference picture selected by the reference picture index of the current block. For example, when the current block performs a uni-directional prediction (PRED_L0) using the reference picture list 0 (list0), it may be inferred as shown in Equation 1, and when the current block performs the uni-directional prediction (PRED_L1) using the reference picture list 1 (list1), it may be inferred as shown in Equation 2.

$$\text{curr\_pic\_as\_ref\_pu} = (\text{DiffPicOrderCnt}(\text{RefPicList0}[\text{ref\_idx\_l0}], \text{currPic}) == 0)?1:0 \quad [\text{Equation 1}]$$

$$\text{curr\_pic\_as\_ref\_pu} = (\text{DiffPicOrderCnt}(\text{RefPicList1}[\text{ref\_idx\_l1}], \text{currPic}) == 0)?1:0 \quad [\text{Equation 2}]$$

In Equations 1 and 2, if the variable curr_pic_as_ref_pu is equal to 1, it indicates that the current block uses the current picture reference mode. Otherwise, it indicates that the current block does not use the current picture reference mode. DiffPicOrderCnt is a function that outputs "0" when the output order information between the reference picture selected by the reference picture index (e.g., RefPicList0[ref_idx_l0]) and the current picture currPic is the same, and outputs "1" when the output order information is different from each other. And, RefPicList0 and RefPicList1 represent the reference picture list 0 and the reference picture list 1, respectively.

2. Embodiment 2: Method Using Slice Type

The current picture reference mode may be adaptively used according to the slice type. For example, there may be restriction that the current picture reference mode is used only in P slice. In this case, whether or not the current picture reference mode is used may be inferred as shown in the following equation 3.

$$\text{curr\_pic\_as\_ref\_pu} = (\text{P\_SLICE \&\& DiffPicOrderCnt}(\text{RefPicList0}[\text{ref\_idx\_l0}], \text{currPic}) == 0)?1:0 \quad [\text{Equation 3}]$$

If the current picture is a P slice and the value of the current picture reference flag is equal to 1, the current picture may be added to the reference picture list 0 and may not be added to the reference picture list 1.

3. Embodiment 3: Method Using Partition Mode

The current picture reference mode may be selectively used according to the partition mode of the coding block. For example, if the partition mode is a symmetric partition, the current picture reference mode may be set to be allowed. Therefore, the value of the partition mode of the coding block in which the current picture reference mode is used may be set to be one of PART_2N×2N, PART_N×2N, PART_2N×N, and PART_N×N. Conversely, in the coding block in which the current picture reference mode is used, it does not have a partition mode of PART_2N×nU, PART_2N×nD, PART nL×2N, and PART_nR×2N, which are asymmetric partitions.

Referring to FIG. 4, a deblocking filter may be applied to the restored current block (S430).

When performing inverse quantization and/or inverse transform on a block basis, discontinuity may occur at the boundary of each block. In addition, discontinuity may occur at the boundary of each block even when motion compensation is performed on a block basis. In order to mitigate the block artifact caused by discontinuity at the block boundary, a filter may be applied to the block boundary, which is called a deblocking filter. The deblocking filter may be applied in units of 8×8 blocks, and a deblocking filter may be applied when the boundary of the 8×8 block is the boundary of the transform unit (TU) or the prediction unit (PU). The deblocking filter may be applied first to the vertical boundary and then to the horizontal boundary. However, the present invention is not limited to this, and may be applied in order of a horizontal boundary and a vertical boundary, or may be applied to a vertical boundary and a horizontal boundary at the same time.

The deblocking filter may be applied to each block boundary based on a predetermined boundary strength (BS). For example, a predetermined BS may be a value of 0, 1 or 2. If the BS value is 0, it indicates that there is almost no block distortion. In this case, the deblocking filtering is not performed. On the other hand, if the BS value is 2, it means that the block distortion is large. In this case, the filtering, where the low frequency component is strong, is performed in order to smoothing the block boundary.

The BS value may be derived using at least one of a prediction mode, motion information, and whether a transform coefficient is present or not. Specifically, the BS value may be derived using the following process.

(1) If at least one of two adjacent blocks forming a block boundary is an intra mode, the BS value is set equal to 2.

(2) If at least one of two adjacent blocks forming a block boundary has one or more non-zero transform coefficients, the BS value is set equal to 1.

(3) The BS value is set equal to 1 if any of the following conditions is satisfied.

Condition 1: two adjacent blocks use different reference pictures or have different numbers of motion vectors Condition 2: two adjacent blocks have one motion vector, and at least one of the absolute value of the horizontal motion vector difference of the two blocks or the absolute value of the vertical motion vector difference of the two blocks is greater than or equal to 4 (quarter-pel unit)

Condition 3: two adjacent blocks have two motion vectors, and at least one of the absolute value of the horizontal motion vector difference or the absolute value of the vertical motion vector difference among the motion vectors for list0 of two blocks, or the absolute value of the horizontal motion vector difference or the absolute value of the vertical motion vector difference among the motion vectors for list1 of two blocks is greater than or equal to 4 (quarter-pel unit)

(4) In the cases other than the above (1) to (3), the BS value is set equal to zero.

On the other hand, even when the current picture uses the current picture reference mode, deblocking filtering may be performed as described above. However, the BS value may be set equal to 1 or 2 according to whether the adjacent two blocks use the current picture reference mode, and one of the following methods may be used.

1. Embodiment 1: Method of Setting the BS Value to 1 in the Current Picture Reference Mode (1) If at least one of two adjacent blocks forming a block boundary is an intra mode, the BS value is set equal to 2.

(2) If at least one of two neighboring blocks forming a block boundary uses the current picture reference mode, the BS value is set equal to 1.

(3) If at least one of the two adjacent blocks forming the block boundary has one or more non-zero transform coefficients, the BS value is set equal to 1.

(4) If any of the following conditions is satisfied, the BS value is set equal to 1.

Condition 1: two adjacent blocks use different reference pictures or have different numbers of motion vectors Condition 2: two adjacent blocks have one motion vector, and at least one of the absolute value of the horizontal motion vector difference of the two blocks or the absolute value of the vertical motion vector difference of the two blocks is greater than or equal to 4 (quarter-pel unit)

Condition 3: two adjacent blocks have two motion vectors, and at least one of the absolute value of the horizontal motion vector difference or the absolute value of the vertical motion vector difference among the motion vectors for list0 of two blocks, or the absolute value of the horizontal motion vector difference or the absolute value of the vertical motion vector difference among the motion vectors for list1 of two blocks is greater than or equal to 4 (quarter-pel unit)

(5) In the cases other than the above (1) to (4), the BS value is set equal to zero.

2. Embodiment 2: Method of Setting the BS Value to 1 or 2 in the Current Picture Reference Mode (1) If at least one of two adjacent blocks forming a block boundary is an intra mode, the BS value is set equal to 2.

(2) If two adjacent blocks forming the block boundary all use the current picture reference mode, the BS value is set equal to 2.

(3) If any one of two neighboring blocks forming a block boundary uses the current picture reference mode, the BS value is set equal to 1.

(4) If at least one of two adjacent blocks forming a block boundary has one or more non-zero transform coefficients, the BS value is set equal to 1.

(5) If any of the following conditions is satisfied, the BS value is set equal to 1.

Condition 1: two adjacent blocks use different reference pictures or have different numbers of motion vectors Condition 2: two adjacent blocks have one motion vector, and at least one of the absolute value of the horizontal motion vector difference of the two blocks or the absolute value of the vertical motion vector difference of the two blocks is greater than or equal to 4 (quarter-pel unit)

Condition 3: two adjacent blocks have two motion vectors, and at least one of the absolute value of the horizontal motion vector difference or the absolute value of the vertical motion vector difference among the motion vectors for list0 of two blocks, or the absolute value of the horizontal motion vector difference or the absolute value of the vertical motion vector difference among the motion vectors for list1 of two blocks is greater than or equal to 4 (quarter-pel unit)

(6) In the cases other than the above (1) to (5), the BS value is set equal to zero.

3. Embodiment 3: Method of Setting the BS Value to 1 or 2 in the Current Picture Reference Mode (1) If at least one of two adjacent blocks forming a block boundary is an intra mode, the BS value is set equal to 2.

(2) If any one of two neighboring blocks forming a block boundary uses the current picture reference mode, the BS value is set equal to 2.

(3) If two adjacent blocks forming the block boundary all use the current picture reference mode, the BS value is set equal to 1.

(4) If at least one of two adjacent blocks forming a block boundary has one or more non-zero transform coefficients, the BS value is set equal to 1.

(5) If any of the following conditions is satisfied, the BS value is set equal to 1.

Condition 1: two adjacent blocks use different reference pictures or have different numbers of motion vectors Condition 2: two adjacent blocks have one motion vector, and at least one of the absolute value of the horizontal motion vector difference of the two blocks or the absolute value of the vertical motion vector difference of the two blocks is greater than or equal to 4 (quarter-pel unit)

Condition 3: two adjacent blocks have two motion vectors, and at least one of the absolute value of the horizontal motion vector difference or the absolute value of the vertical motion vector difference among the motion vectors for list0 of two blocks, or the absolute value of the horizontal motion vector difference or the absolute value of the vertical motion vector difference among the motion vectors for list1 of two blocks is greater than or equal to 4 (quarter-pel unit)

(6) In the cases other than the above (1) to (5), the BS value is set equal to zero.

Figure 5:
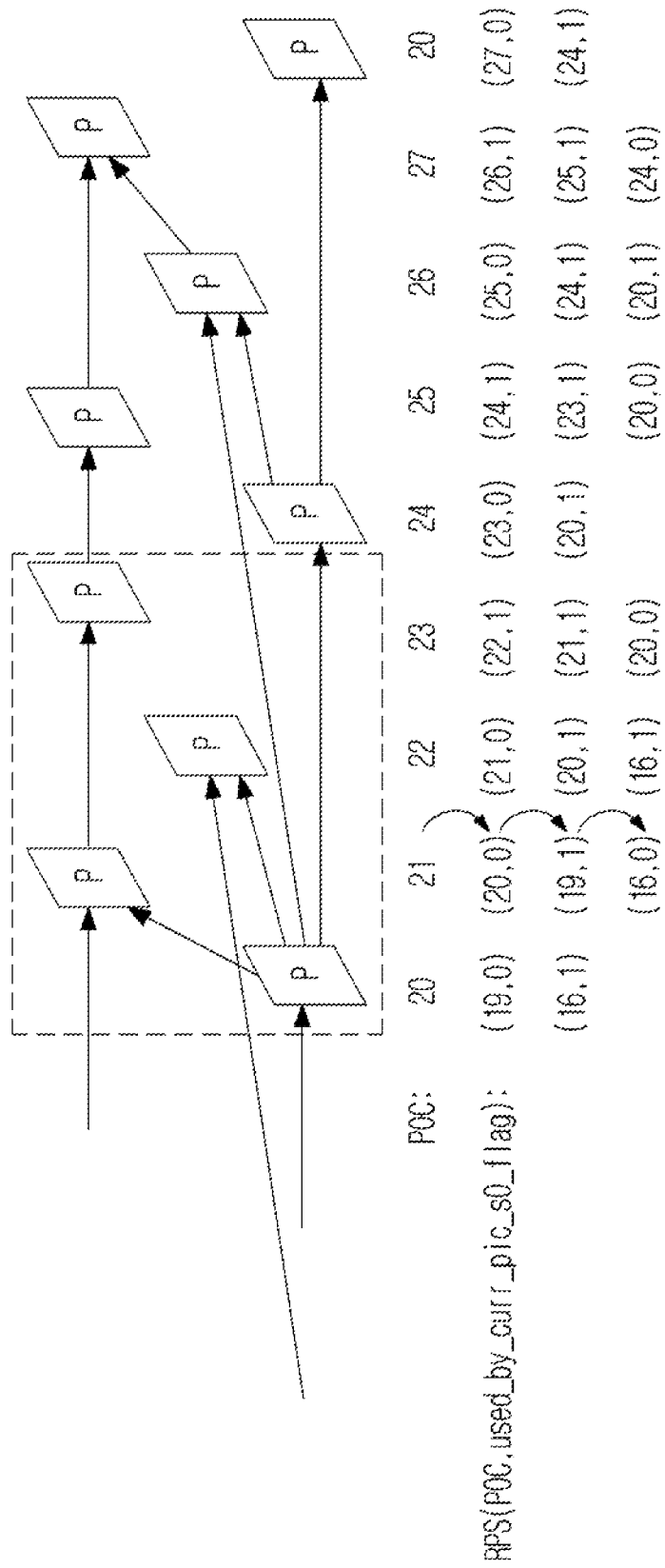
FIG. 5 illustrates a method of specifying a short-term reference picture stored in a decoding picture buffer according to an embodiment of the present invention.

FIG. 5 illustrates a method of specifying a short-term reference picture stored in a decoding picture buffer according to an embodiment of the present invention.

The temporal reference picture may be stored in the decoding picture buffer (DPB) and used as a reference picture if necessary for inter prediction of the current picture. The temporal reference picture stored in the decoding picture buffer may include a short-term reference picture. The short-term reference picture means a picture in which the difference of output order information (POC) from the current picture is not large.

Information specifying the short-term reference picture to be stored in the decoding picture buffer at the present time is composed of output order information(POC) of the reference picture and a flag indicating whether the current picture directly refer to (for example, used_by_curr_pic_s0_flag, used_by_curr_pic_s1_flag). And, it is referred to as a reference picture set. Specifically, when the value of the used_by_curr_pic_s0_flag [i] is equal to 0, if the i-th short-term reference picture in the short-term reference picture set has a value smaller than the output order (POC) of the current picture, it indicates that the i-th short-term reference picture is not used as a reference picture of the current picture. when the value of the used_by_curr_pic_s1_flag [i] is equal to 0, if the i-th short-term reference picture in the short-term reference picture set has a value larger than the output order (POC) of the current picture, it indicates that the i-th short-term reference picture is not used as a reference picture of the current picture.

Referring to FIG. 5, in the case of a picture having a POC value of 26, all three pictures (i.e., pictures having POC values of 25, 24, and 20) may be used as a short-term reference picture in inter prediction. However, since the value of used_by_curr_pic_s0_flag for the picture having the POC value of 25 is equal to 0, the picture having the POC value of 25 is not directly used for the inter prediction of the picture having the POC value of 26.

Thus, the short-term reference picture may be specified based on output order information (POC) of the reference picture and the flag indicating whether to use as the reference picture of the current picture.

On the other hand, for a picture not shown in the reference picture set for the current picture, an indication (for example, unused for reference) that the picture is not used as a reference picture may be marked and further removed from the decoding picture buffer.

Figure 6:
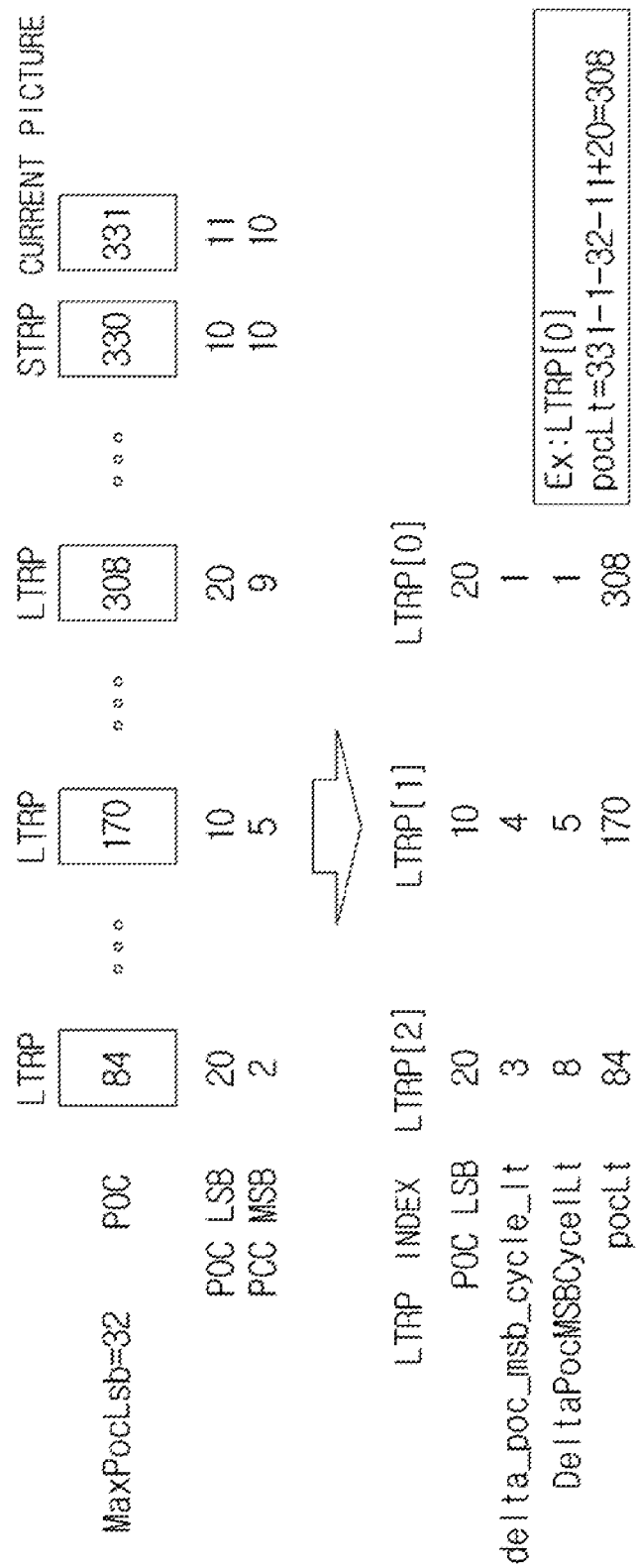
FIG. 6 illustrates a method of specifying a long-term reference picture according to an embodiment of the present invention.

FIG. 6 illustrates a method of specifying a long-term reference picture according to an embodiment of the present invention.

In the case of the long-term reference picture, since the difference between the POC values of the current picture and the long-term reference picture is large, the least significant bit (LSB) and the most significant bit (MSB) of the POC value may be used.

Therefore, the POC value of the long-term reference picture may be derived by using the LSB of the POC value of the reference picture, the POC value of the current picture, and the difference between the MSB of the POC value of the current picture and the MSB of the POC value of the reference picture.

For example, it is assumed that the POC value of the current picture is 331, the maximum value that may be represented by the LSB is 32, and the picture having the POC value of 308 is used as the long-term reference picture.

In this case, the POC value 331 of the current picture may be expressed as 32*10+11, where 10 is the MSB value and 11 is the LSB value. The POC value 308 of the long-term reference picture is represented by 32*9+20, where 9 is the MSB value and 20 is the LSB value. At this time, the POC value of the long-term reference picture may be derived as shown in the equation of FIG. 6.

Figure 7:
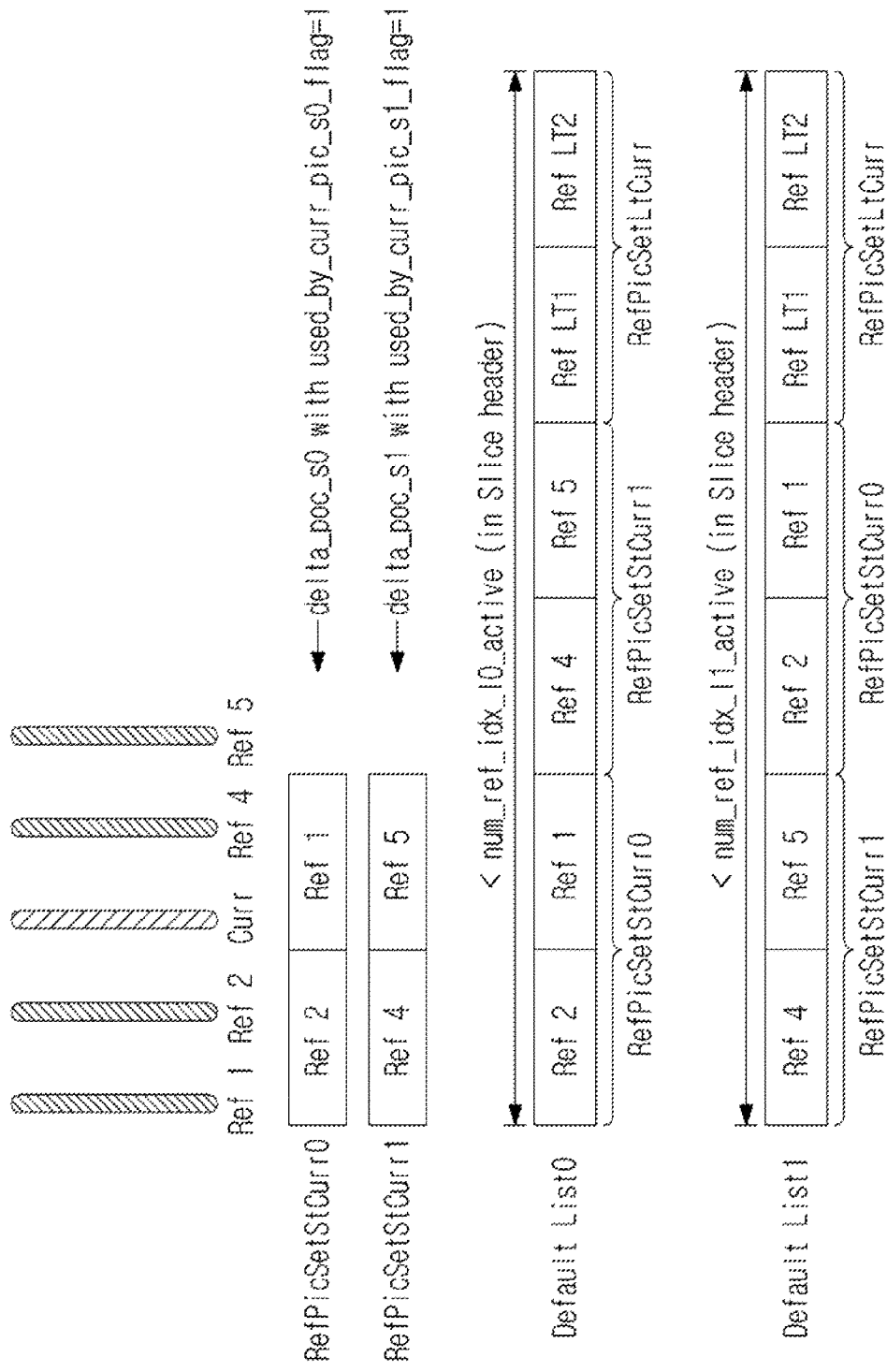
FIG. 7 illustrates a method of constructing a reference picture list using a short-term reference picture and a long-term reference picture according to an embodiment of the present invention.

FIG. 7 illustrates a method of constructing a reference picture list using a short-term reference picture and a long-term reference picture according to an embodiment of the present invention.

Referring to FIG. 7, a reference picture list including a temporal reference picture may be generated by considering whether a temporal reference picture is a short-term reference picture and a POC value of a short-term reference picture. Here, the reference picture list may include at least one of a reference picture list 0 for L0 prediction and a reference picture list 1 for L1 prediction.

Specifically, in the reference picture list 0, the reference pictures may be arranged in an order of a short-term reference picture (RefPicSetCurr0) having a POC value smaller than the current picture, a short-term reference picture (RefPicSetCurr1) having a POC value larger than the current picture, and a long-term reference picture (RefPicSetLtCurr).

In the reference picture list 1, the reference pictures may be arranged in an order of a short-term reference picture (RefPicSetCurr1) having a POC value larger than the current picture, a short-term reference picture (RefPicSetCurr0) having a POC value smaller than the current picture, and a long-term reference picture (RefPicSetLtCurr).

In addition, a plurality of temporal reference pictures included in the reference picture list may be rearranged to improve the coding efficiency of the reference picture index allocated to temporal reference pictures. This may be performed adaptively based on the list rearrangement flag (list_modification_present_flag). Here, the list rearrangement flag is information for specifying whether or not reference pictures in the reference picture list are rearranged. The list rearrangement flag may be signaled for each of the reference picture list 0 and the reference picture list 1.

For example, when the value of the list rearrangement flag (list_modification_present_flag) is equal to 0, the reference pictures in the reference picture list are not rearranged, and only when the value of the list rearrangement flag (list_modification_present_flag) is equal to 1, the reference pictures may be rearranged.

If the value of the list rearrangement flag (list_modification_present_flag) is equal to 1, the reference pictures in the reference picture list may be rearranged using the list_entry information list_entry [i]. Here, the list entry information (list_entry [i]) may specify the reference picture and/or the reference picture index to be located at the current position (i.e., the i-th entry) in the reference picture list.

Specifically, the reference picture corresponding to the list entry information (list_entry [i]) may be specified in the reference picture list, and the specified reference picture may be arranged at the i-th entry in the reference picture list.

The list entry information may be obtained by the number of reference pictures contained in the reference picture list or by the maximum reference picture index of the reference picture list. Further, the list entry information may be obtained based on the slice type of the current picture. That is, if the slice type of the current picture is a P slice, the list entry information list_entry_l0 [i] for the reference picture list 0 is obtained. If the slice type of the current picture is a B slice, the entry information (list_entry_l1 [i]) for the reference picture list 1 may be additionally obtained.

Figure 8:
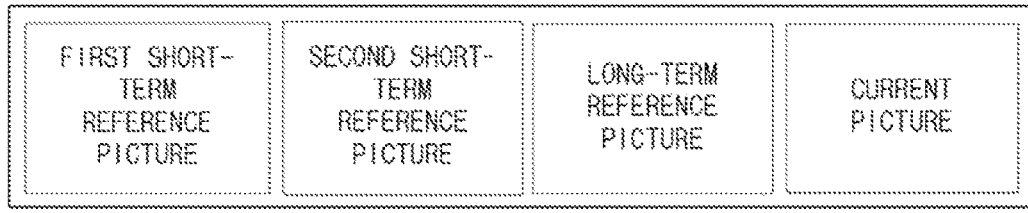
FIGS. 8 to 10 illustrate a method of constructing a reference picture list for a current picture reference mode according to an embodiment to which the present invention is applied.
Figure 8:
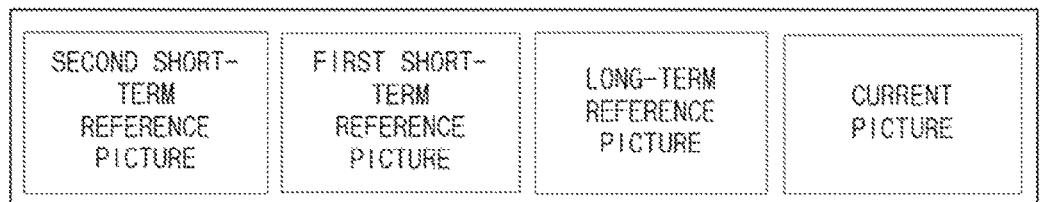
Figure 9:
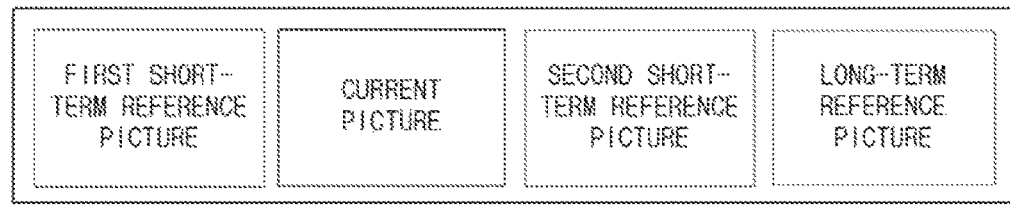
Figure 9:
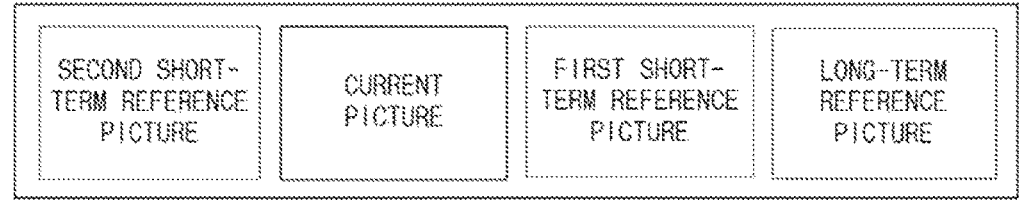
Figure 10:
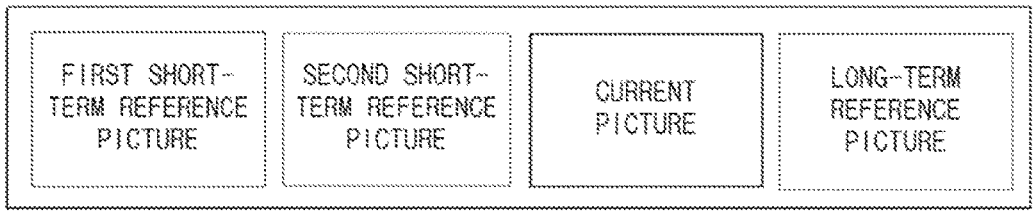
Figure 10:
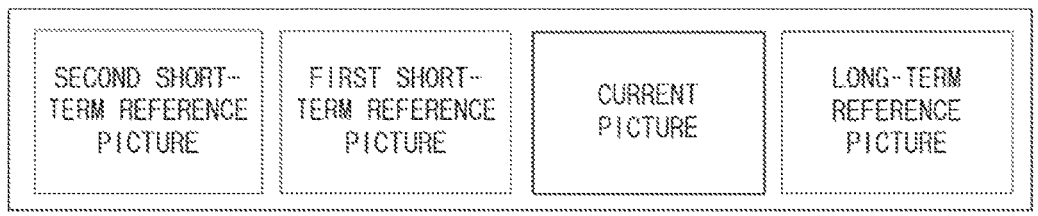

FIGS. 8 to 10 illustrate a method of constructing a reference picture list for a current picture reference mode according to an embodiment to which the present invention is applied.

Referring to FIG. 8, in the reference picture list 0, the reference pictures may be arranged in an order of a short-term reference picture (hereinafter referred to as a first short-term reference picture) having a smaller POC value than the POC value of the current picture, a short-term reference picture having a POC value larger than the POC value of the current picture (hereinafter referred to as a second short-term reference picture), and a long-term reference picture. In the reference picture list 1, the reference pictures may be arranged in an order of a second short-term reference picture, a first short-term reference picture, and a long-term reference picture. Then, the current picture may be arranged after the long-term reference picture, in the reference picture list 0 and the reference picture list 1. An index is assigned to each of the reference pictures arranged in this manner, and an index of the largest value may be assigned to the current picture. Here, the index of the largest value may be derived based on information about the total number of reference pictures contained in the reference picture list. The information about the total number may be encoded by the video encoding apparatus and signaled to the video decoding apparatus. For example, the video encoding apparatus may encode a value obtained by subtracting 1 from the total number of reference pictures included in the reference picture list. In this case, in the video decoding apparatus, the reference picture index of the current picture may be assigned equal to a value of information about the total number.

However, the present invention is not limited to this. As shown in FIGS. 9 and 10, the coding performance of the reference picture list may be improved by adding the current picture before the long-term reference picture.

Referring to FIG. 9, the current picture may be arranged between the short-term reference pictures in the reference picture list. Specifically, in the reference picture list 0, the reference pictures may be arranged in an order of a first short-term reference picture, a current picture, a second short-term reference picture, and a long-term reference picture. In the reference picture list 1, the reference pictures may be arranged in an order of a second short-term reference picture, a current picture, a first short-term reference picture, and a long-term reference picture.

Alternatively, the current picture may be arranged between the short-term reference picture and the long-term reference picture in the reference picture list. Referring to FIG. 10, in the reference picture list 0, the reference pictures may be arranged in an order of a first short-term reference picture, a second short-term reference picture, a current picture, and a long-term reference picture. In the reference picture list 1, the reference pictures may be arranged in an order of a second short-term reference picture, a first short-term reference picture, a current picture, and a long-term reference picture.

FIGS. 8 to 10 illustrate an embodiment of constructing a reference picture list in which the number of each of a short-term reference picture having a smaller POC value than the current picture, a short-term reference picture having a larger POC value than the current picture, and a long-term reference picture is 1. FIGS. 8 to 10 merely illustrate the arrangement order of the reference pictures, and a plurality of short-term reference pictures (i.e., a short-term reference picture set) and long-term reference pictures (i.e., a long-term reference picture set) may be used.

Figure 11:
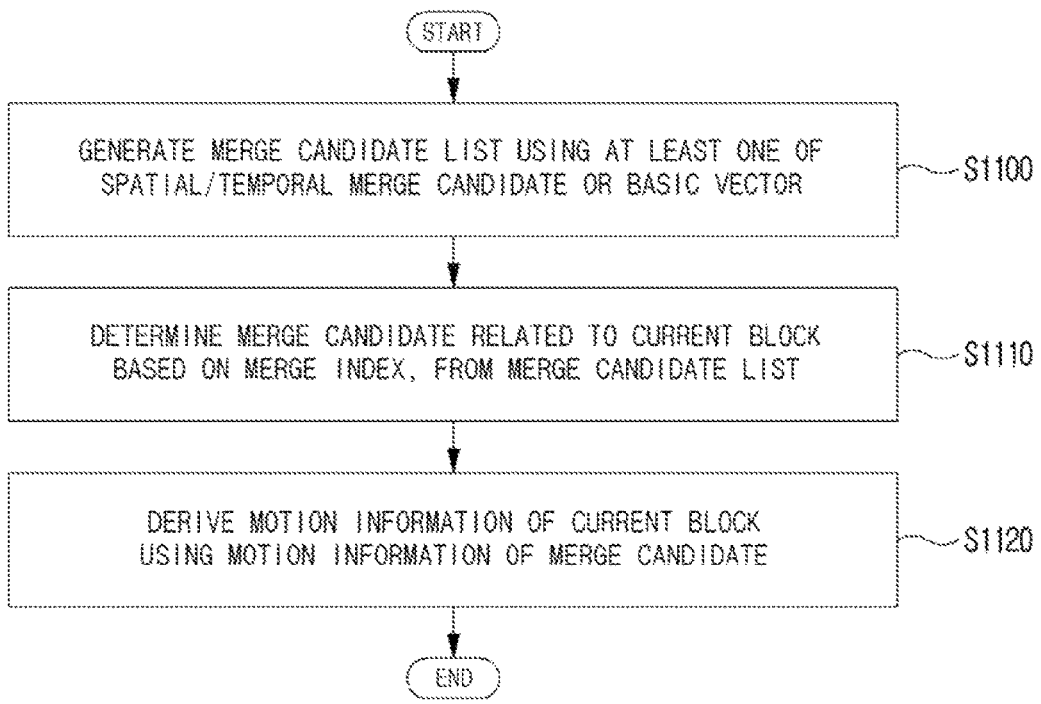
FIG. 11 illustrates a method of deriving motion information of a current block based on a merge mode according to an embodiment of the present invention.

FIG. 11 illustrates a method of deriving motion information of a current block based on a merge mode according to an embodiment of the present invention.

Referring to FIG. 11, a merge candidate list for a current block may be generated using at least one of a spatial/temporal merge candidate or a basic vector (S1100).

An available block among neighboring blocks spatially adjacent to the current block (hereinafter, referred to as spatial neighboring block) may be determined as the spatial merge candidate of the present invention. The spatial neighboring block may include at least one of the left neighbor block A1, the upper neighbor block B1, the upper right neighbor block B0, the lower left neighbor block A0, or the left upper neighbor block B2 of the current block. The spatial merge candidate may be determined by determining whether the neighboring block is the available block, in order of A1->B1->B0->A0->B2. Here, whether the neighboring block is the available block may be determined based on at least one of whether the neighboring block is present, whether the neighboring block is coded in the intra mode, and whether the neighboring block is coded in the current picture reference mode. In the case of B2, it may be used only in a case where at least one of A1, B1, B0, and A0 is not present or is coded in intra mode.

The temporal merge candidate of the present invention may be a neighboring block temporally adjacent to the current block (hereinafter, referred to as temporal neighboring block), and a block located at the same position as the current block in a collocated picture located at a time zone different from the current block. The block at the same position may mean a block (first temporal merge candidate) including the position of the right-bottom of the current block and/or a block (second temporal merge candidate) including the position of the center sample of the current block. The second temporal merge candidate may be used only when the first temporal merge candidate is not an available block. Also, when the current block is included in the current picture using the current picture reference mode, the current block may not use the temporal merge candidate, and the merge candidate list may not include the temporal merge candidate.

A combined bi-predictive merge candidate, a zero motion vector, and the like may be added to the merge candidate list in addition to the spatial/temporal merge candidate.

The basic vector of the present invention includes at least one of (−w, 0), (−2w, 0), (0, −h), (0, −2h), (−w, −h), here, "w" represents the width of the current block, and "h" represents the height of the current block.

At least two of the spatial/temporal merge candidates, combined bi-predictive merge candidates, zero motion vectors, and basic vectors described above may be arranged in the merge candidate list according to pre-defined priorities.

For example, it may be arranged in the merge candidate list in order of spatial merge candidate, combined bi-predictive merge candidate, and basic vector. As described above, the basic vector includes at least one of (−w, 0), (−2w, 0), (0, −h), (0, −2h), (−w, −h), and the basic vector may be included in the merge candidate list according to a pre-defined order. Or, they may be arranged in the merge candidate list in order of the spatial merge candidate and the basic vector, or may be arranged in the merge candidate list in order of the basic vector and the spatial merge candidate.

Referring to FIG. 11, the merge candidate for the current block may be determined, from the merge candidate list, based on the merge index (S1110).

The merge index may mean an index that specifies a merge candidate used for inter-prediction of the current block among a plurality of merge candidates included in the merge candidate list. The merge index may be signaled on a block-by-block basis or may be derived to a pre-defined constant value according to the number of merge candidates included in the merge candidate list.

Referring to FIG. 11, the motion information of the current block may be derived using the motion information of the merge candidate determined in step S1110 (S1120).

Specifically, the motion information of the current block may be set to be the same as the motion information of the merge candidate. That is, the motion vector and the reference picture index of the merge candidate may be used as the motion vector and the reference picture index of the current block.

Alternatively, the motion vector of the current block may be derived by converting the resolution of the motion vector of the merge candidate according to whether the current block uses the current picture reference mode.

For example, if the current block uses the current picture reference mode, the current block may use the motion vector of an integer pel unit. That is, when the reference picture index of the current block selects the current picture in the reference picture list, the motion vector of the current block may be derived by scaling the motion vector of the merge candidate based on a predetermined scaling factor. Here, the reference picture index of the current block may be the same as the reference picture index of the merge candidate determined in step S1110. The scaling factor may be a preset constant value to convert the resolution of the motion vector between the merge candidate and the current block. Or, the scaling factor may be a constant value that is variably determined according to the resolution of the motion vector of the merge candidate. For example, if the resolution of the motion vector of the merge candidate is quarter pel, the motion vector of the current block may be derived as shown in Equation 4.

$$MvLX[0]=mvLX[0]>>2$$

$$MvLX[1]=mvLX[1]>>2 \quad \text{[Equation 4]}$$

On the other hand, when the current block does not use the current picture reference mode, the current block may use a motion vector of the integer pel unit or less (e.g., half pel, quarter pel). In this case, the motion information of the current block may be set to be the same as the motion information of the merge candidate.

Figure 12:
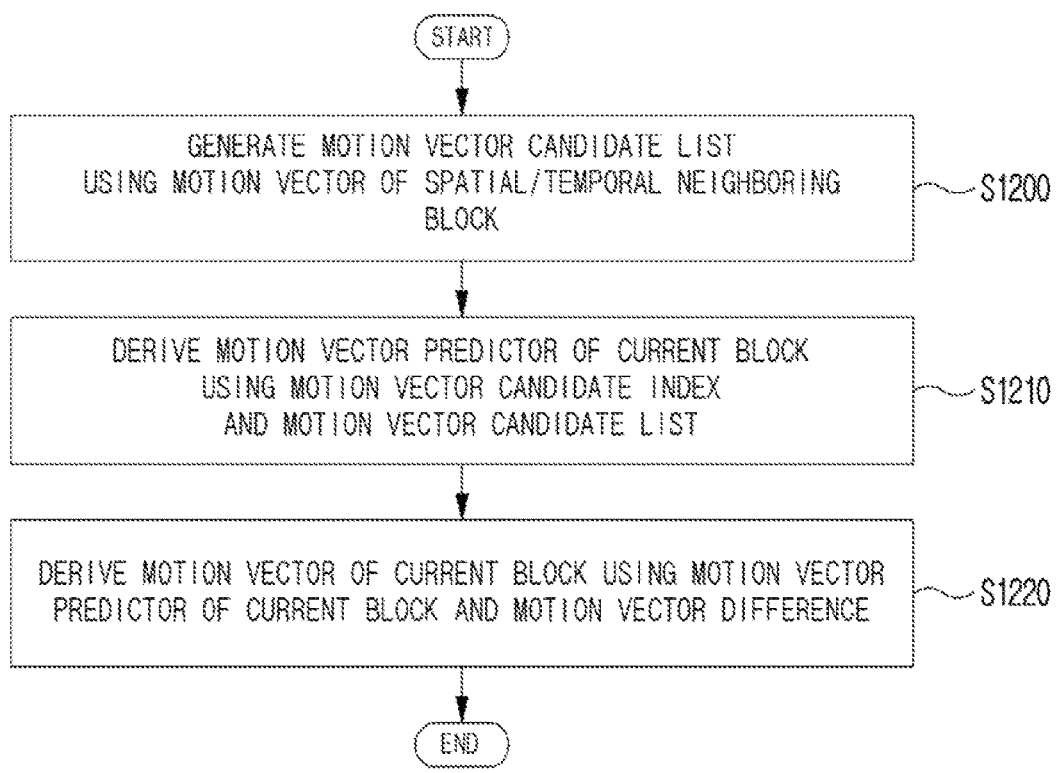
FIG. 12 illustrates a method of deriving a motion vector of a current block based on an AMVP mode according to an embodiment of the present invention.

FIG. 12 illustrates a method of deriving a motion vector of a current block based on an AMVP mode according to an embodiment of the present invention.

Referring to FIG. 12, a motion vector candidate list may be generated using motion vectors of spatial/temporal neighboring blocks (S1200).

The motion vector candidate list of the present invention may include a plurality of motion vector candidates, and the number of the plurality of motion vector candidates may be fixed. The plurality of motion vector candidates may include motion vectors of the spatial/temporal neighbor blocks. A fixed number of motion vector candidates may be inserted into the motion vector candidate list, based on priorities between spatial neighbor blocks (e.g., left->top) and/or priorities between spatial and temporal neighbor blocks (e.g., spatial->temporal). Here, the spatial/temporal neighbor blocks are as described in detail in FIG. 11, and a detailed description thereof will be omitted.

Referring to FIG. 12, a motion vector predictor of a current block may be derived using a motion vector candidate index and a motion vector candidate list (S1210).

The motion vector candidate index may mean an index that specifies a motion vector candidate used to derive a motion vector predictor of the current block from a plurality of motion vector candidates included in the motion vector candidate list. The motion vector candidate selected by the motion vector candidate index may be set as the motion vector predictor of the current block.

Referring to FIG. 12, a motion vector of a current block may be derived using a motion vector predictor of a current block and a motion vector difference (S1220).

Specifically, the motion vector of the current block may be derived by adding the motion vector predictor and the motion vector difference determined in step S1210.

Alternatively, the resolution of the motion vector predictor determined in step S1210 may be changed depending on whether the current block uses the current picture reference mode. For example, if the current block uses the current picture reference mode, the current block may use a motion vector of an integer pel unit. That is, when the reference picture index of the current block selects the current picture in the reference picture list, the resolution of the motion vector predictor of the current block may be changed by scaling the motion vector predictor derived in step S1210 with a predetermined scaling factor. Here, the scaling factor may be a preset constant value to change the resolution of the motion vector predictor of the current block. Or, the scaling factor may be a constant value that is variably determined according to the resolution of the motion vector of the neighboring block used to derive the motion vector predictor of the current block. The motion vector of the current block may be derived by adding the motion vector difference to the changed motion vector predictor.

For example, if the resolution of the motion vector predictor of the current block is a quarter pel, the motion vector of the current block may be derived as shown in Equation 5.

$$mvLX[0]=mvpLX[0]>>2+mvdLX[0]$$

$$mvLX[1]=mvpLX[1]>>2+mvdLX[1] \quad \text{[Equation 5]}$$

Referring to Equation 5, the motion vector of the current block is derived by scaling the motion vector predictor of the current block by 2 to change the resolution of the motion vector predictor, and adding the motion vector difference thereto. The motion vector difference is a difference between the motion vector and the changed motion vector predictor, which may be encoded by the video encoding apparatus and signaled to the video decoding apparatus.

On the other hand, when the current block does not use the current picture reference mode, the current block may use a motion vector of the integer pel unit or less (e.g., half pel, quarter pel). In this case, the motion vector of the current block may be derived by adding the motion vector predictor determined in step S1210 and the motion vector difference.

INDUSTRIAL AVAILABILITY

The present invention can be used to code a video signal.
The invention claimed is:
1. A method of decoding a video signal, the method comprising: generating a reference picture list based on a current picture reference flag for a current picture; obtaining motion information about a current block in the current picture, the motion information including at least one of a motion vector and a reference picture index; restoring the current block using the motion information of the current block and the reference picture list relating to the current picture; and applying a deblocking filter to the restored current block, wherein the current picture reference flag indicates whether or not a current picture reference mode is applied for the current picture, the current picture reference mode refers to a method of predicting or restoring the current block by referring to a pre-reconstructed block in the current picture, wherein, in the reference picture list, temporal reference pictures are arranged in an order of a first short-term reference picture having a smaller POC (Picture Order Count) value than the POC value of the current picture, a second short-term reference picture having a larger POC value than the POC value of the current picture, and a long-term reference picture, and wherein the current picture is added to the reference picture list at last position after the long-term reference picture when the current picture reference flag indicates that the current picture reference mode is applied for the current picture.

2. The method of claim 1, wherein the motion information for the current block is derived based on whether the current block uses the current picture reference mode.

3. The method of claim 1, wherein the motion information for the current block includes the reference picture index, and whether the current picture reference mode is applied for the current block within the current picture is determined based on the reference picture index of the current block.

4. The method of claim 3, if the value of the reference picture index of the current block is equal to a maximum value among the indexes assigned to the reference picture list, the current picture reference mode is applied for the current block.

5. An apparatus of decoding a video signal, the apparatus comprising:
an entropy decoding unit configured to obtain a current picture reference flag for a current picture and motion information about a current block in the current picture;
a prediction unit configured to generate a reference picture list based on the current picture reference flag for a current picture, and restore the current block using the motion information of the current block and the reference picture list relating to the current picture; and
an in-loop filtering unit configured to apply a deblocking filter to the stored current block,
wherein the current picture reference flag indicates whether or not a current picture reference mode is applied for the current picture, the current picture reference mode refers to a method of predicting or restoring the current block by referring to a pre-reconstructed block in the current picture,
wherein the motion information includes at least one of a motion vector and a reference picture index,
wherein, in the reference picture list, temporal reference pictures are arranged in an order of a first short-term reference picture having a smaller POC (Picture Order Count) value than the POC value of the current picture, a second short-term reference picture having a larger POC value than the POC value of the current picture, and a long-term reference picture, and
wherein the current picture is added to the reference picture list at last position after the long-term reference picture when the current picture reference flag indicates that the current picture reference mode is applied for the current picture.

6. The apparatus of claim 5, wherein the prediction unit is configured to derive the motion information for the current block, based on whether the current block uses the current picture reference mode.

7. A method of encoding a video signal, the method comprising:
generating a reference picture list based on a current picture reference flag for a current picture;
obtaining motion information about a current block in the current picture, the motion information including at least one of a motion vector and a reference picture index;
restoring the current block using the motion information of the current block and the reference picture list relating to the current picture and
applying a deblocking filter to the restored current block,
wherein the current picture reference flag indicates whether or not a current picture reference mode is applied for the current picture, the current picture reference mode refers to a method of predicting or restoring the current block by referring to a pre-reconstructed block in the current picture,
wherein, in the reference picture list, temporal reference pictures are arranged in an order of a first short-term reference picture having a smaller POC (Picture Order Count) value than the POC value of the current picture, a second short-term reference picture having a larger POC value than the POC value of the current picture, and a long-term reference picture, and
wherein the current picture is added to the reference picture list at last position after the long-term reference picture when the current picture reference flag indicates that the current picture reference mode is applied for the current picture.

8. The method of claim 7, wherein the motion information for the current block is derived based on whether the current block uses the current picture reference mode.

9. An apparatus of encoding a video signal, the apparatus comprising:
a prediction unit configured to generate a reference picture list based on a current picture reference flag for a current picture, obtain motion information about a current block in the current picture, and restore the current block using the motion information of the current block and the reference picture list relating to the current picture;
an in-loop filtering unit configured to apply a deblocking filter to the restored current block, and
an entropy encoding unit configured to generate an encoded bitstream including the current picture reference flag and the motion information about the current block in the current picture,
wherein the current picture reference flag indicates whether or not a current picture reference mode is applied for the current picture, the current picture reference mode refers to a method of predicting or restoring the current block by referring to a pre-reconstructed block in the current picture,
wherein the motion information includes at least one of a motion vector and a reference picture index,
wherein, in the reference picture list, temporal reference pictures are arranged in an order of a first short-term reference picture having a smaller POC (Picture Order Count) value than the POC value of the current picture, a second short-term reference picture having a larger POC value than the POC value of the current picture, and a long-term reference picture, and wherein the current picture is added to the reference picture list at last position after the long-term reference picture when the current picture reference flag indicates that the current picture reference mode is applied for the current picture.

\* \* \* \* \*